United States Patent
Mothafar

(10) Patent No.: US 9,440,488 B1
(45) Date of Patent: Sep. 13, 2016

(54) HUBLESS WHEEL SYSTEM FOR MOTOR VEHICLES

(71) Applicant: Ahmed Y. A. Mothafar, Safat (KW)

(72) Inventor: Ahmed Y. A. Mothafar, Safat (KW)

( * ) Notice: Subject to any disclaimer, the term of this patent is extended or adjusted under 35 U.S.C. 154(b) by 0 days.

(21) Appl. No.: 15/018,715

(22) Filed: Feb. 8, 2016

(51) Int. Cl.
| | |
|---|---|
| *B62D 61/00* | (2006.01) |
| *B60B 19/00* | (2006.01) |
| *B60B 25/00* | (2006.01) |
| *B60B 21/08* | (2006.01) |
| *B60B 11/02* | (2006.01) |
| *B60K 17/04* | (2006.01) |
| *B62K 5/01* | (2013.01) |

(52) U.S. Cl.
CPC ............. *B60B 19/00* (2013.01); *B60B 11/02* (2013.01); *B60B 21/08* (2013.01); *B60B 25/00* (2013.01); *B60K 17/043* (2013.01); *B62K 5/01* (2013.01)

(58) Field of Classification Search
CPC .... B60K 7/0007; B60K 17/046; B60K 1/00; B60K 2007/0038; B60K 2007/0092; H02K 7/116; H02K 7/14; H02K 5/18; F16H 2001/3258; B60L 2220/44; Y02T 10/641
USPC .......................... 180/21; 301/6.5, 6.6, 6.7, 6.8
See application file for complete search history.

(56) References Cited

U.S. PATENT DOCUMENTS

| | | | | |
|---|---|---|---|---|
| 4,702,843 | A * | 10/1987 | Oswald ................ | B60C 23/003 180/24.07 |
| 4,923,257 | A * | 5/1990 | Purcell ............... | B62D 55/0655 180/9.1 |
| 6,101,911 | A * | 8/2000 | Newell .................... | B23B 5/04 82/112 |
| 6,813,979 | B2 * | 11/2004 | Caorle ...................... | B23B 5/02 82/112 |
| 6,839,939 | B2 | 1/2005 | Donakowski | |
| 7,568,541 | B2 | 8/2009 | Pfeil et al. | |
| 7,798,512 | B2 | 9/2010 | Kanou | |
| 9,120,195 | B2 * | 9/2015 | Veldman | |
| 2002/0005303 | A1 * | 1/2002 | Haringer .............. | A01B 51/026 180/9.1 |
| 2008/0185905 | A1 * | 8/2008 | Fujita ........................ | B60B 1/12 301/6.8 |
| 2012/0215389 | A1 * | 8/2012 | Perry ....................... | B60K 6/48 701/22 |
| 2013/0009450 | A1 * | 1/2013 | Suzuki ................. | B60K 7/0007 301/6.5 |
| 2013/0057048 | A1 * | 3/2013 | Ishikawa .............. | B60K 7/0007 301/6.5 |
| 2014/0058600 | A1 | 2/2014 | Hoffmann et al. | |
| 2014/0358369 | A1 | 12/2014 | Anderfaas | |

FOREIGN PATENT DOCUMENTS

WO    WO 90/05070 A1    5/1990

* cited by examiner

*Primary Examiner* — Toan To
(74) *Attorney, Agent, or Firm* — Richard C. Litman

(57) ABSTRACT

The hubless wheel system includes an inner ring assembly having a main stationary ring and a plurality of inner ring mounting brackets positioned within the main stationary ring, a first bearing and a second bearing mounted onto the main stationary ring, a side plate positioned in communicating relation with the second bearing, a middle ring assembly mounted onto the bearings of the inner ring assembly, and an outer ring mounted on the middle ring assembly. The middle ring assembly has a middle ring and a brake disc positioned in communicating relation with the middle ring. The outer ring has an inner portion and a plurality of outer ring mounting brackets positioned on the inner portion of the outer ring, and a bracket assembly positioned within the main stationary ring. The hubless wheel system can include a drive assembly, a step-lock assembly, a side wheel assembly, and a suspension assembly.

20 Claims, 29 Drawing Sheets

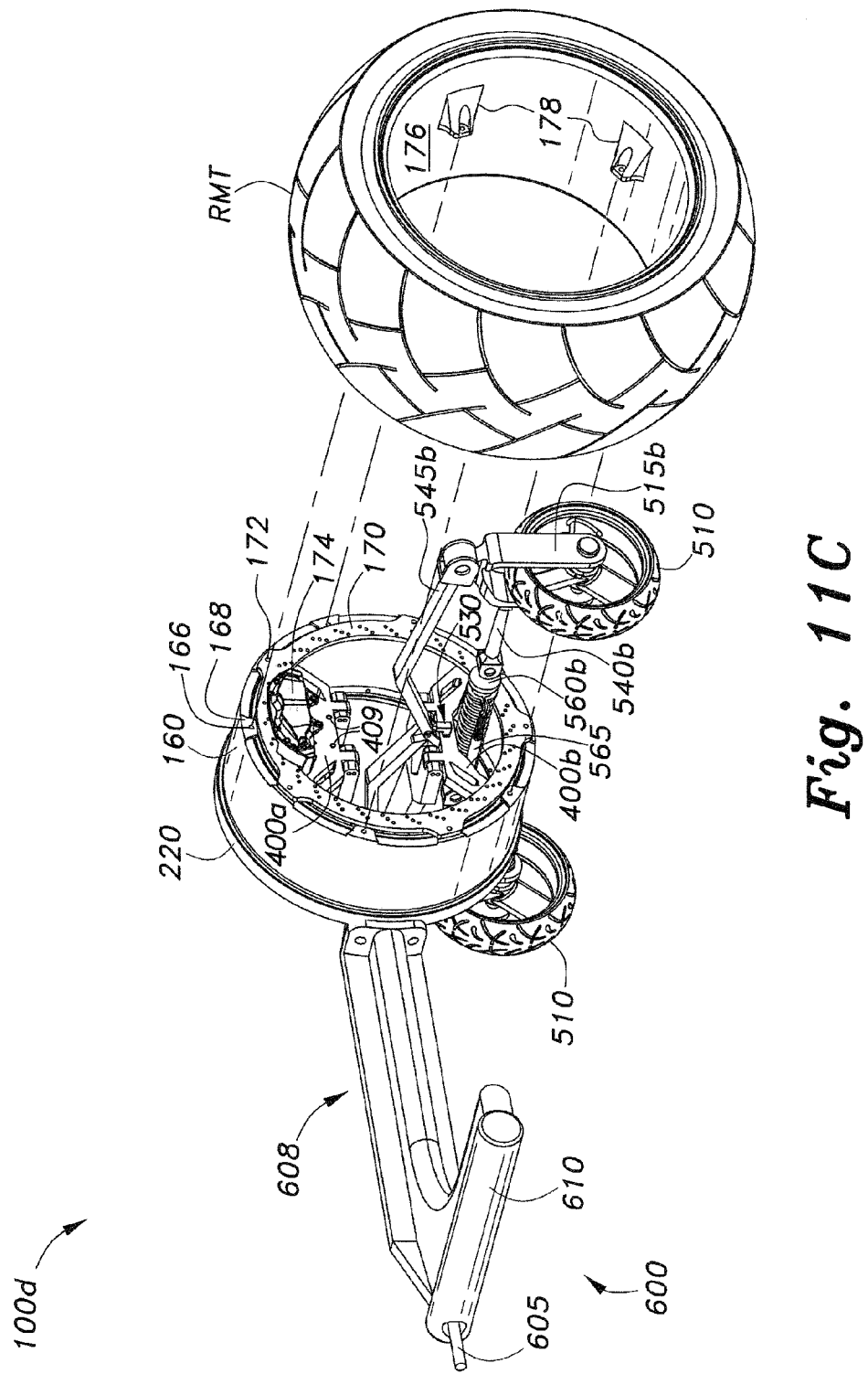

HUBLESS WHEEL SYSTEM FOR MOTOR VEHICLES

BACKGROUND OF THE INVENTION

1. Field of the Invention

The present invention relates to vehicle wheels, and particularly to a hubless/center-less wheel system for motor vehicles.

2. Description of the Related Art

Currently, there are a variety of hubless wheel systems for motor vehicles. However, conventional hubless wheel systems are typically very expensive to manufacture, difficult to install and repair, such as for end users, and are improperly balanced so as to adversely impact the handling of a vehicle. Further, the gears, bearings, and other mechanical parts of conventional hubless wheel systems are typically exposed to the elements, such as water and dirt, causing them to break down frequently and require costly repairs.

Thus, a hubless wheel system for motor vehicles solving the aforementioned problems is desired.

SUMMARY OF THE INVENTION

The hubless wheel system for motor vehicles includes an inner ring assembly, a middle ring assembly rotatably mounted on the inner ring assembly, an outer ring mounted on the middle ring, and a bracket assembly positioned within the inner ring. The inner ring assembly includes a main stationary ring including an outer track and an inner track, a plurality of inner ring mounting brackets positioned within the main stationary ring, a first bearing mounted on the inner track, a second bearing mounted on the outer track, and a side plate positioned in communicating relation with the second bearing. The middle ring assembly is mounted onto the bearings of the inner ring assembly. The middle ring assembly has a middle ring and a brake disc positioned in communicating relation with the middle ring. The outer ring is mounted on the middle ring assembly, the outer ring having an inner portion and a plurality of outer ring mounting brackets positioned on the inner portion of the outer ring. The hubless wheel system can include a drive assembly, a step-lock assembly, a side wheel assembly, and a suspension assembly. The hubless wheel system can be compact, lightweight, and easy to install.

These and other features of the present invention will become readily apparent upon further review of the following specification and drawings.

BRIEF DESCRIPTION OF THE DRAWINGS

FIG. 11C is a view illustrating a middle ring assembly coupled to the inner ring assembly having a side wheel assembly exploded away from an outer ring used in connection with a fourth embodiment of a hubless wheel system, according to the present invention.

Similar reference characters denote corresponding features consistently throughout the attached drawings.

DETAILED DESCRIPTION OF THE PREFERRED EMBODIMENTS

Figure 1A:
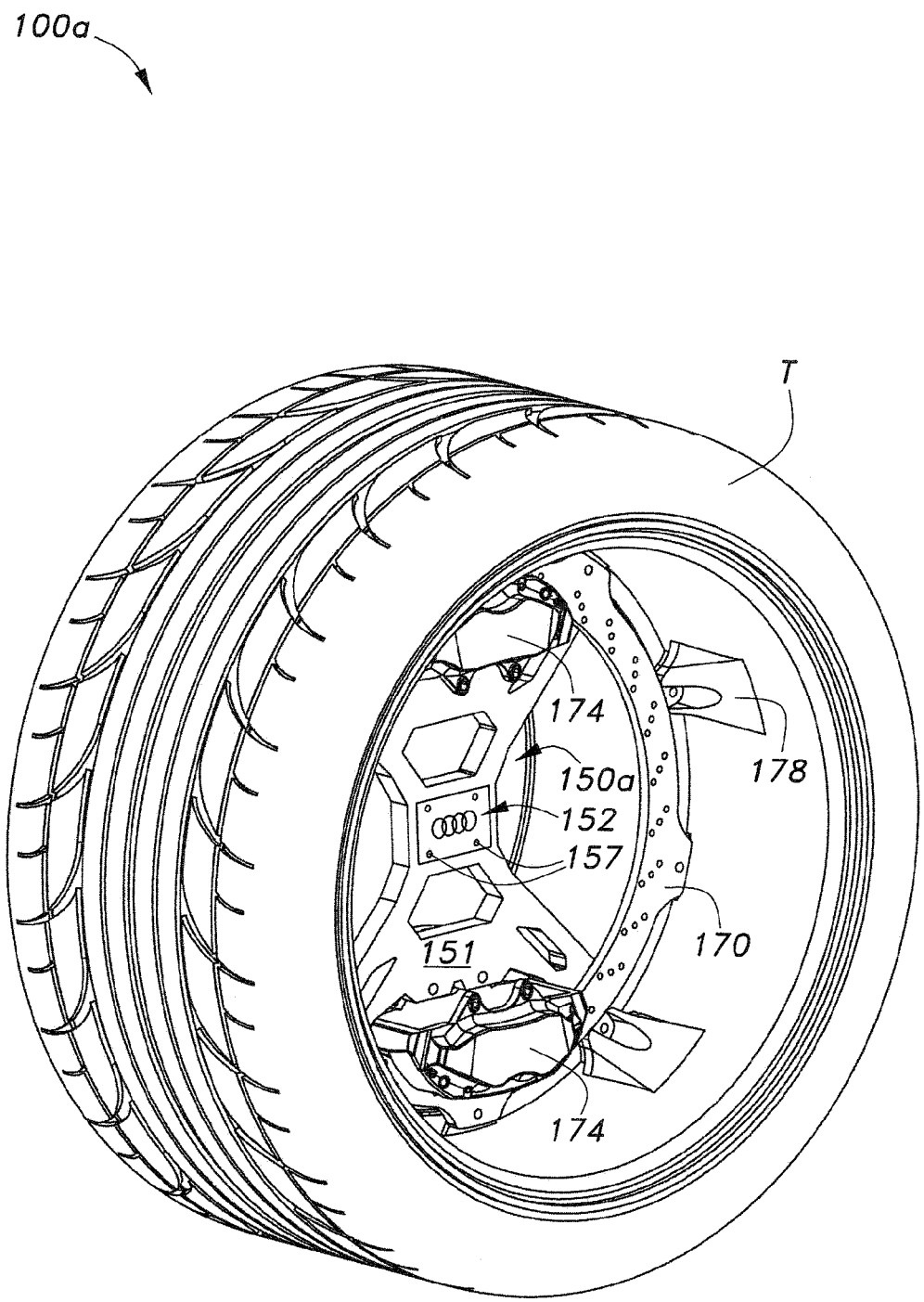
FIG. 1A is a front perspective view of a first embodiment of a hubless wheel system for motor vehicles, according to the present invention.

FIGS. 1A-11C depict various embodiments of a hubless wheel system according to the present teachings. Referring to FIGS. 1A-2C, a first embodiment of the hubless wheel system, generally designated 100a, is shown. The hubless wheel system 100a includes an inner ring assembly 105 having a main stationary ring 110, a bracket assembly 150a positioned within the main stationary ring 110, a middle ring assembly 159 configured to be mounted onto the inner ring assembly 105, and an outer ring 176 adapted to fit within a vehicle tire T, such as a car tire, wherein the middle ring assembly 159 can be mounted onto the inner ring assembly 105. The middle ring assembly 159, having the inner ring assembly 105, can be positioned within the outer ring 176, such as in a coaxial arrangement, as illustrated in FIG. 2C. The outer ring 176 can be secured within a tire T of a vehicle, such as a car, truck, van, or motorcycle.

Figure 2A:
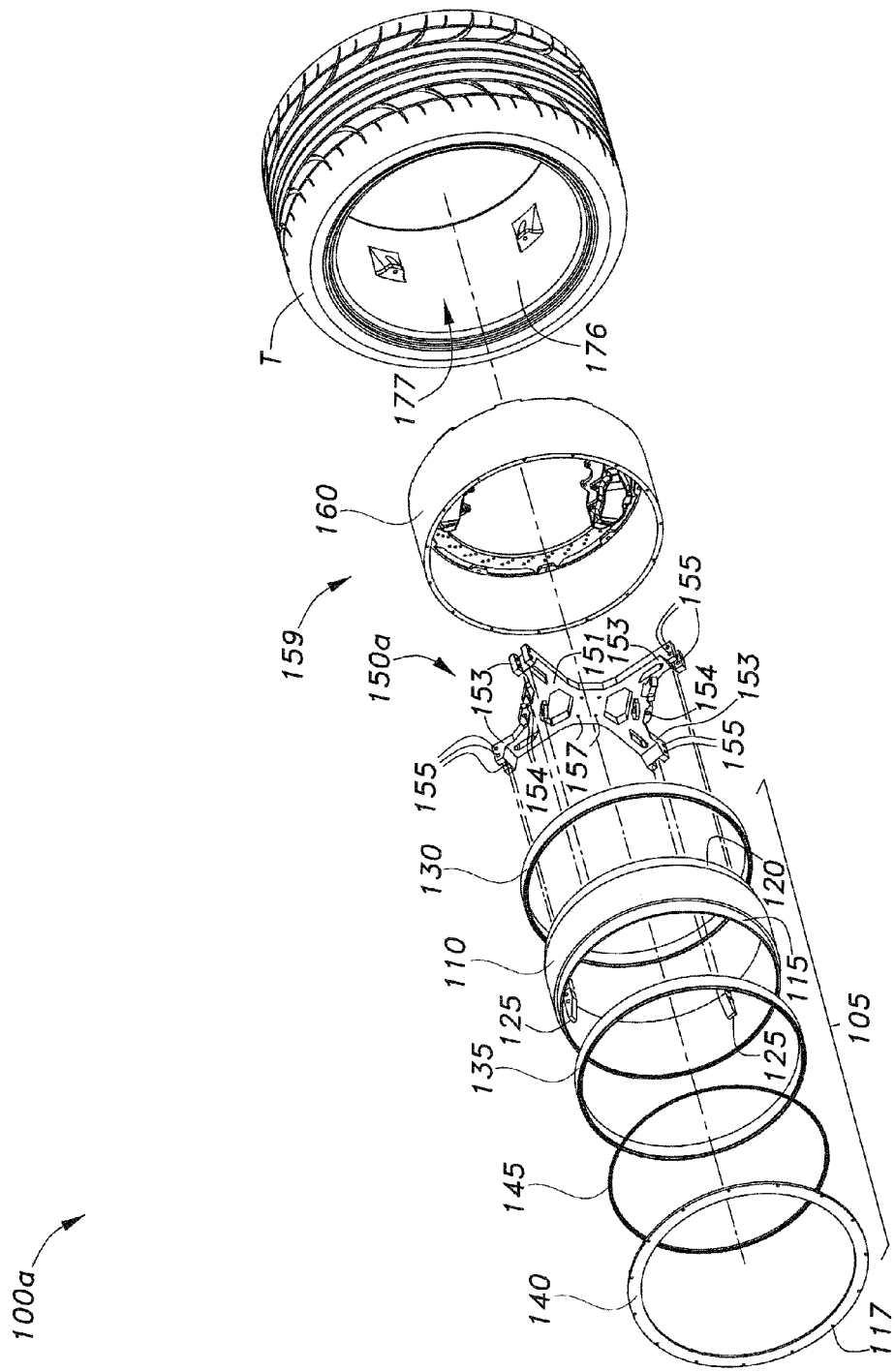
FIG. 2A is an exploded view of an inner ring assembly and a bracket assembly used in connection with a first embodiment of a hubless wheel system for motor vehicles, according to the present invention.

Referring to FIG. 2A, the main stationary ring 110 of the inner ring assembly 105 includes a given width, as well as an outer track 115 and an inner track 120, and a plurality of inner ring mounting brackets 125 within the main stationary ring 110. The inner ring assembly 105, further, includes a first bearing 130 that can be mounted, e.g., rotatably mounted, on the inner track 120 of the main stationary ring 110 and a second bearing 135 that can be mounted, e.g., rotatably mounted, on the outer track 115 of the main stationary ring 110, and a side plate 140 positioned in communicating relation with the second bearing 135. A seal ring 145 can be positioned between the side plate 140 and the second bearing 135 to prevent any elements, such as water, mud, sand, and/or dirt, from coming into contact with the second bearing 135. Further, the inner ring assembly 105 can include a plurality of thread holes 117.

Figure 2B:
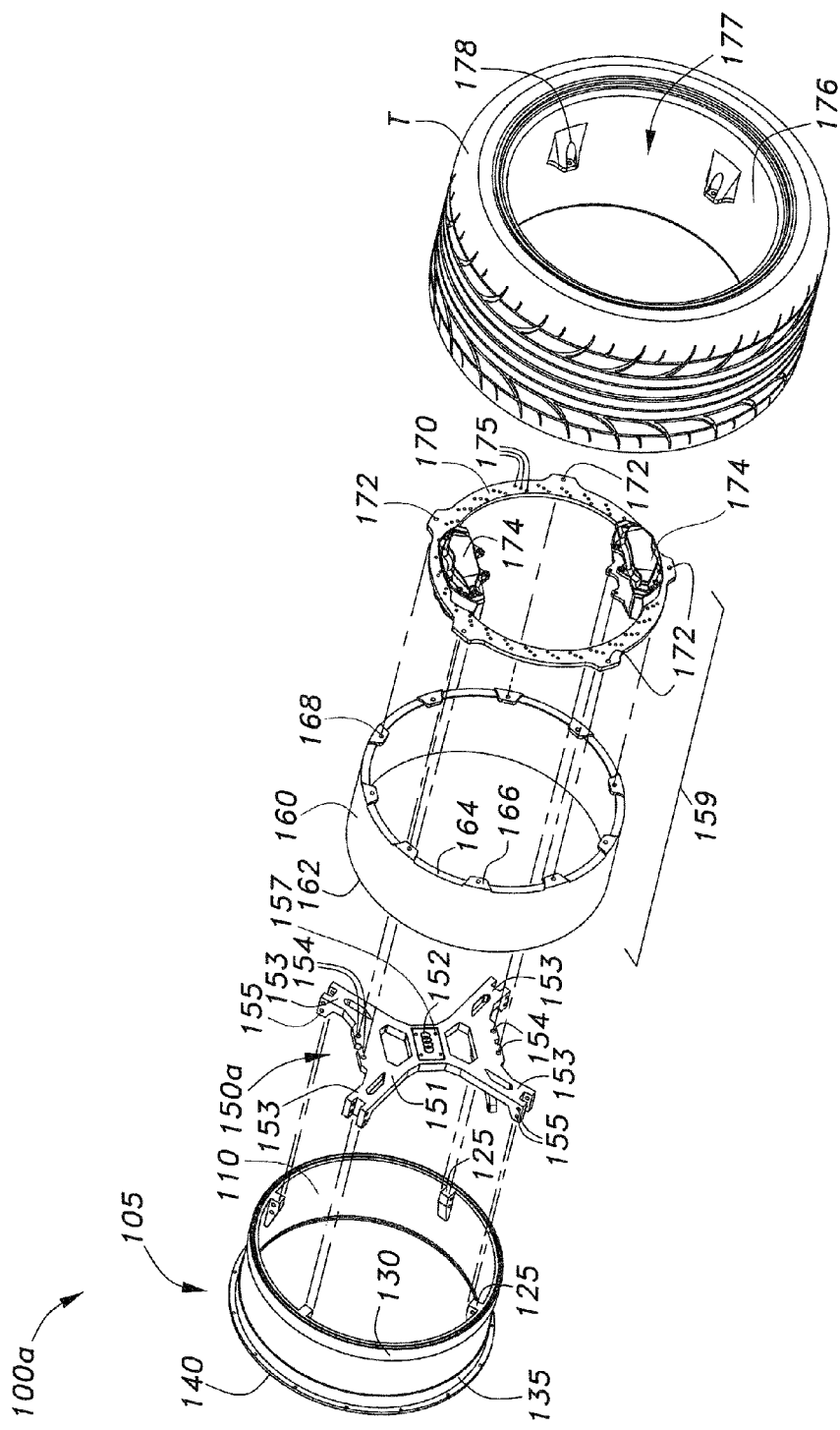
FIG. 2B is an exploded view of a middle ring assembly and a bracket assembly used in connection with a first embodiment of a hubless wheel system for motor vehicles, according to the present invention.

Referring to FIGS. 2B-2C, the middle ring assembly 159 includes a middle ring 160 including an outer side 162 and an inner side 164, the inner side 164 having a plurality of mounting tabs 166. Each mounting tab 166 can have an opening 168. A brake disc 170 can be positioned in communicating relation with the inner side 164 of the middle ring 160. The brake disc 170 can have a plurality of primary openings 172 and a plurality of secondary openings 175. Each of the plurality of primary openings 172 of the brake disc 170 can be aligned with corresponding openings 168 of the plurality of mounting tabs 166 to facilitate securing the brake disc 170 to the inner side 164 of the middle ring 160 using suitable fasteners, such as screws. For example, a screw can be threaded through one of the plurality of primary openings 172 of the brake disc 170 and into the corresponding opening 168 in the corresponding mounting tab 166 until the brake disc 170 is secured, such as substantially secured, to the middle ring 160. Some of the mounting tabs 166 can be left unattached to the brake disc 170 for reasons which will be described in detail below. The plurality of secondary openings 175 in the brake disc 170 can be configured to provide cooler operation and powerful stable braking to the brake disc 170. Further, the size of the brake disc 170 can contribute to a cooler operation, such as when the brakes are applied, and, in turn, to a longer working brake disc 170.

The middle ring assembly 159 can also include at least one disc brake caliper 174 in communicating relation with the brake disc 170. The at least one disc brake caliper 174 can be activated by a braking system (not shown). Upon activation, the at least one disc brake caliper 174 can squeeze a pair of pads (not shown) against the brake disc 170 so as to stop the vehicle tire T from rotating and, in turn, stop the vehicle. It is to be understood that the middle ring assembly 159 of first embodiment 100a can include two disc brake calipers 174 as illustrated in FIGS. 1A-2C.

The outer ring 176 can have a width equal to about twice the given width of the main stationary ring 110. The outer ring 176 can be positioned within a tire, such as a car tire T or a motorcycle tire MT. The outer ring 176 includes an inner portion 177 and a plurality of outer ring mounting brackets 178 positioned within the inner portion 177 of the outer ring 176. Each of the outer ring mounting brackets 178 are configured to align with a corresponding one of the remaining (unattached) mounting tabs 166 of the middle ring assembly 159, i.e. the mounting tabs that are not attached to the brake disc 170, as described above.

Continuing with reference to FIGS. 2A-2B, a bracket assembly 150a of the first embodiment 100a can include a bracket or X-shaped member 151 having a plurality of ends 153 (desirably four ends 153). The X-shaped member 151 can be a unitary member. Each of the plurality of ends 153 of the member 151 can include a plurality of primary openings 155 and a plurality of secondary openings 154. The plurality of primary openings 155 are configured for receiving fasteners for securing the bracket assembly 150a within the main stationary ring 110 of the inner ring assembly 105, such as onto each of the plurality of inner ring mounting brackets 125. The plurality of secondary openings 154 are configured for receiving fasteners for securing the at least one disc brake caliper 174 to the bracket assembly 150a of the first embodiment 100a. For example, each of the plurality of ends 153 of the bracket assembly 150a of the first embodiment 100a can be mounted to one of the plurality of mounting brackets 125 positioned within the main stationary ring 110 and secured to the corresponding mounting bracket 125, such as by inserting a fastener, such as a screw, through each of the plurality of primary openings 155 and into the corresponding mounting bracket 125.

Figure 2C:
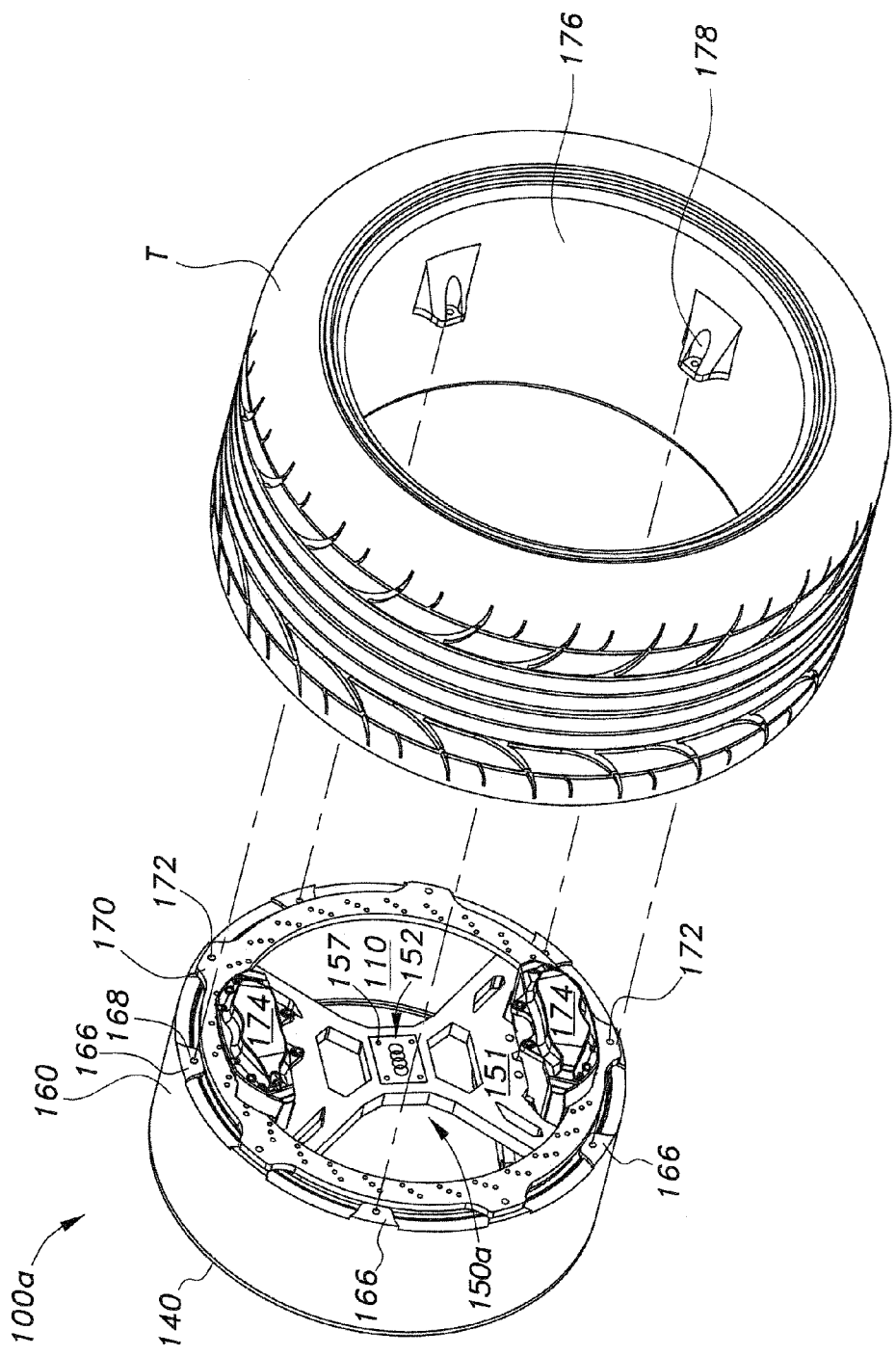
FIG. 2C is a view of the inner ring assembly positioned inside the middle ring assembly exploded away from an outer ring used in connection with a first embodiment of a hubless wheel system for motor vehicles, according to the present invention.
Figure 3A:
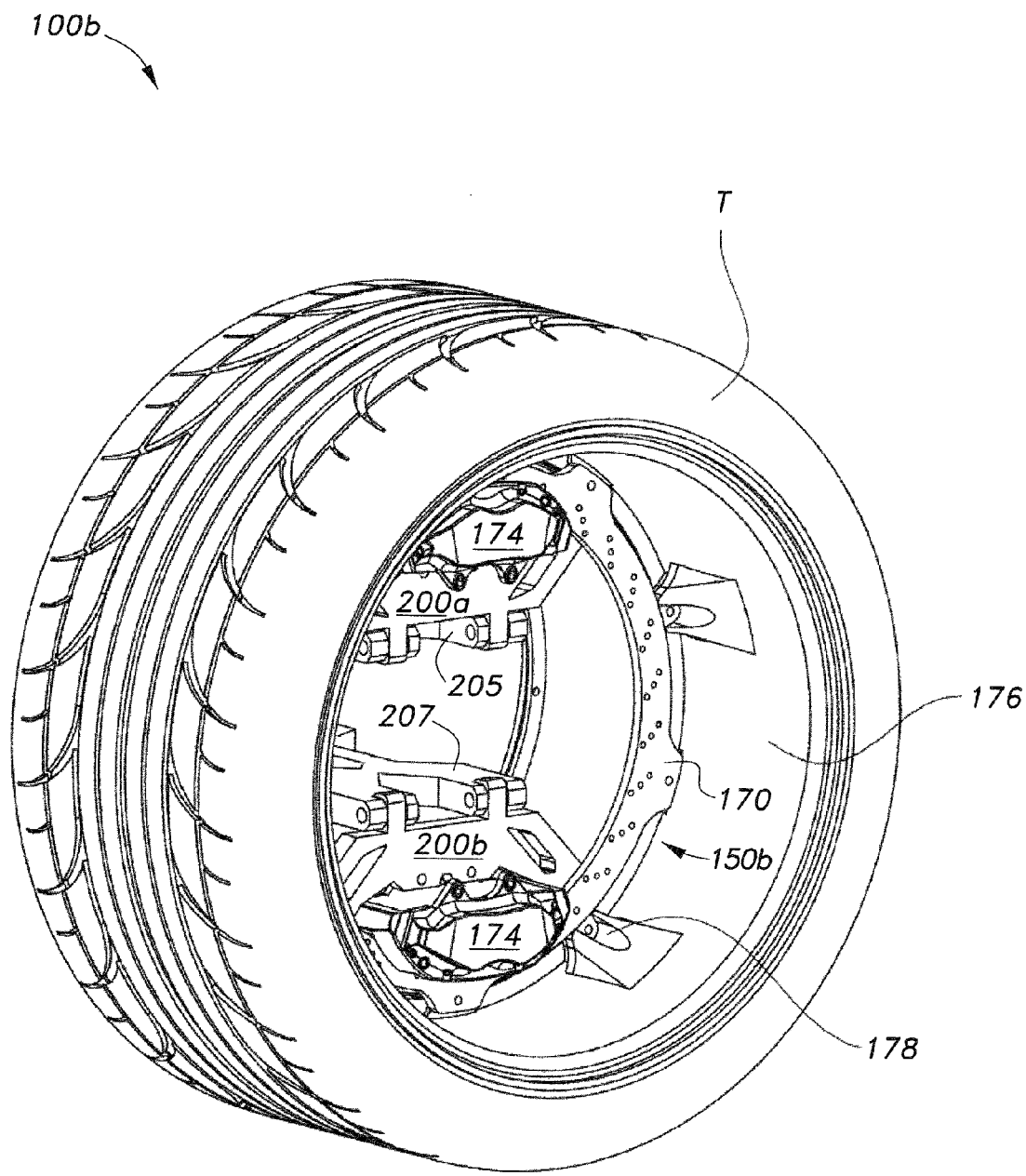
FIG. 3A is a front perspective view of a second embodiment of a hubless wheel system for motor vehicles, according to the present invention.
Figure 3B:
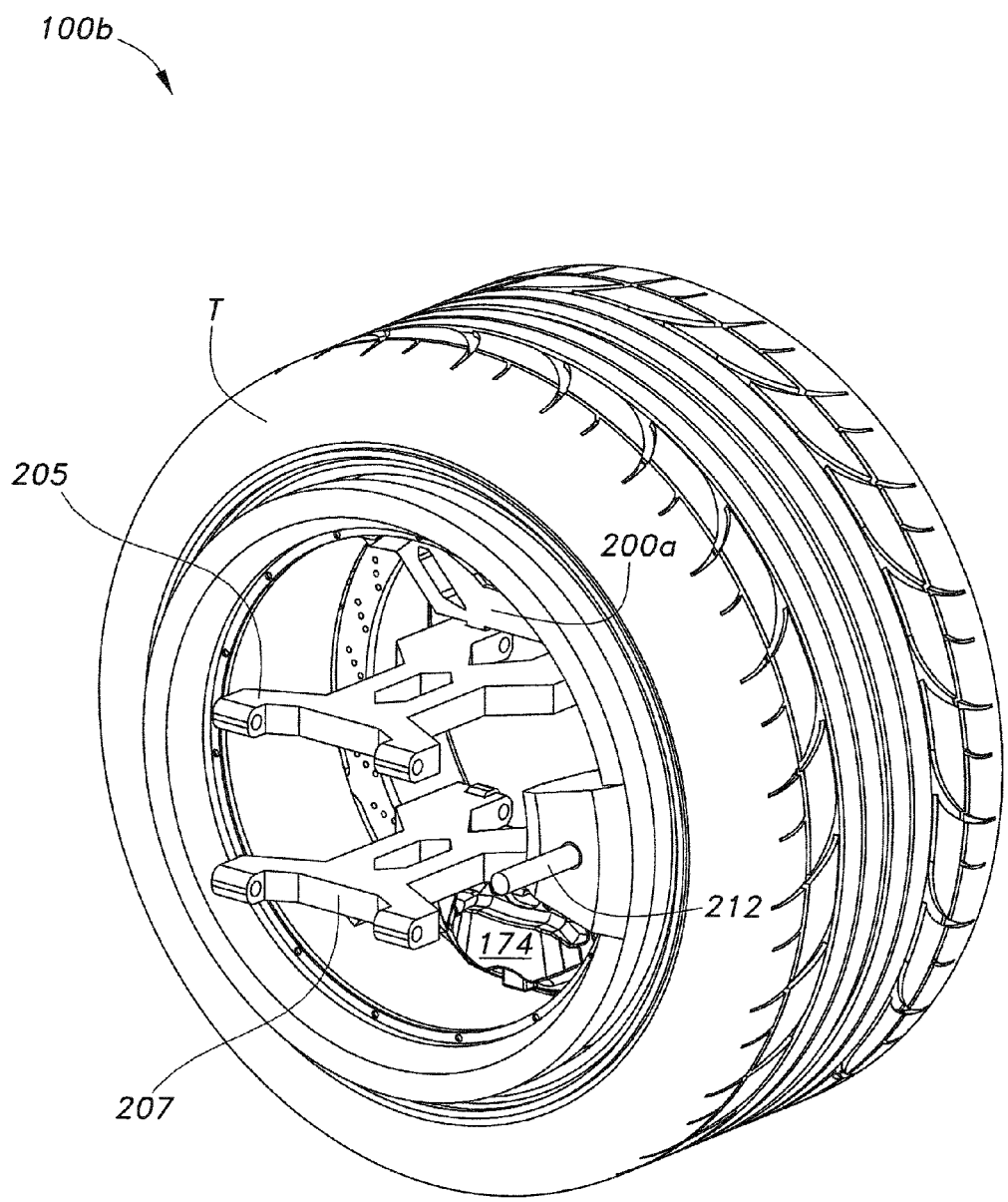
FIG. 3B is a rear perspective view of a second embodiment of a hubless wheel system for motor vehicles, according to the present invention.

It is to be noted that the bracket assembly 150a of the first embodiment 100a can also include an advertising section 152 configured for displaying an advertisement, brand, or logo, such as the Audi® logo, as illustrated in FIGS. 1A, 2B, and 2C. It is to be noted that the advertisement, brand, or logo can have any suitable shape, such as a generally oval shape, a generally rectangular shape, a generally circular shape, or a generally square shape. The advertising section 152 can have a plurality of openings 157 for receiving fasteners to secure the advertisement, brand, or a logo to the advertising section 152. It is to be noted that a monitor (not shown), such as a water/dust proof monitor, displaying an advertisement, a logo, or a brand, such as an aftermarket brand, can be secured to the advertising section 152 of the first bracket assembly 150a. The monitor can be covered so as to keep any dust, dirt, and/or water away from the panel or monitor.

By way of operation, once the bracket assembly 150a of the first embodiment 100a is secured to the plurality of inner ring mounting brackets 125 within the main stationary ring 110, the inner ring assembly 105 can be inserted into the middle ring 160 of the middle ring assembly 159 (FIG. 2C). For example, the middle ring 160 can be mounted onto the bearings 130, 135, which are mounted onto the inner track 120 and the outer track 115, respectively, of the main stationary ring 110. The brake disc 170 can be attached and secured to the middle ring 160, as described above. Mounting the middle ring assembly 159 onto the bearings 130, 135 on the main stationary ring 110 can allow the middle ring 160 and the brake disc 170 to rotate freely about the main stationary ring 110 of the inner ring assembly 105.

Figure 1B:
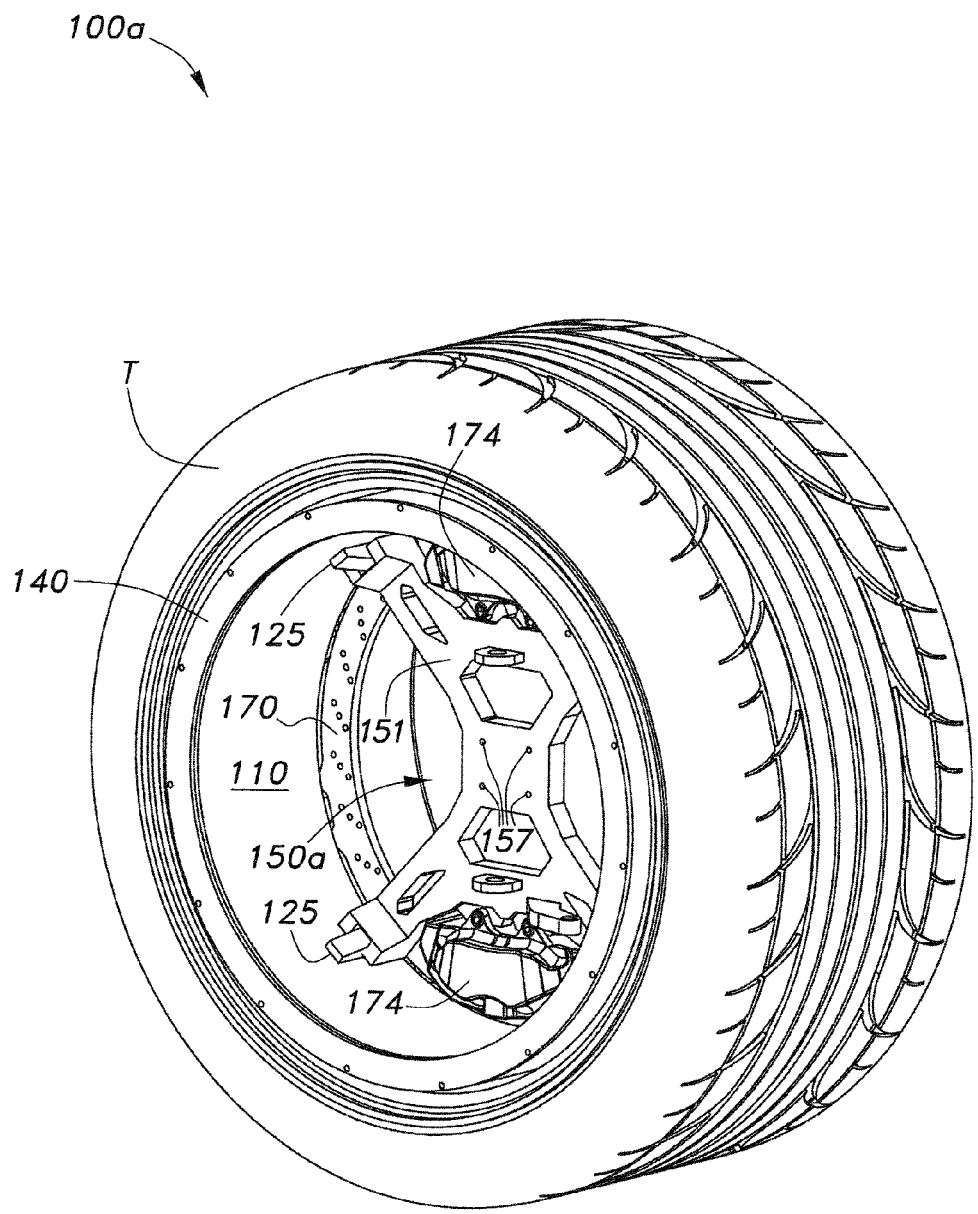
FIG. 1B is a rear perspective view of the first embodiment of a hubless wheel system for motor vehicles, according to the present invention.

The at least one disc brake caliper 174 can be positioned in communicating relation to the brake disc 170 and secured to the bracket assembly 150a positioned within the main stationary ring 110 by attaching the at least one disc brake caliper 174 to the member 151 by any suitable means known in the art. The middle ring assembly 159, having the inner ring assembly 105, can then be positioned within and secured to the outer ring 176 so as to form a vehicle wheel as illustrated in FIGS. 1A and 1B. Attaching the at least one disc brake caliper 174 to the bracket assembly 150a of the first embodiment 100a positioned within the main stationary ring 110 can allow the at least one disc brake caliper 174 to stop the vehicle tire T, mounted on the middle ring assembly 159, from rotating, as described above.

The vehicle wheel, as illustrated in FIGS. 1A and 1B, having the first embodiment 100a can then be attached to a vehicle, such as a car, such as by any conventional means already known in the art. After attaching the vehicle tire T having the first embodiment 100a to a vehicle, such as a car, the driver of the vehicle can attach the advertisement, brand, or logo, such as the Audi®, to the advertising section 152 of the bracket assembly 150a of the first embodiment 100a and secure the advertisement, brand, or logo onto the advertising section 152, such as by inserting any type of suitable fastener(s) through the advertisement, brand, or logo and into each of the plurality of openings 157 of the advertising section 152.

Mounting the middle ring assembly 159 onto the bearings 130, 135 on the inner ring assembly 105 can provide the necessary rotating ability to allow the vehicle tire T to rotate freely (i.e. passive rotation) about the bracket assembly 150a of the first embodiment 100a without rotating the X-shaped member 151 of the bracket assembly 150a of the first embodiment 100a. For example, vehicle tires T having the first embodiment 100a can be attached to the front of a rear wheel drive car or to the rear of a front wheel drive car, such that the tires having the first embodiment can be passively rotated by the rear wheels in a rear wheel drive car or the front wheels in a front wheel drive car. Such an arrangement can also allow the advertisement, brand, or logo to be seen as the vehicle passes, since the advertising section 152 will not be rotating.

FIGS. 3A-4C depict a second embodiment of the hubless wheel system, generally designated as 100b. The hubless wheel system 100b is substantially similar to the first embodiment 100a, described herein except that the hubless wheel system 100b includes a bracket assembly 150b having an upper portion 200a including an upper suspension arm 205, and a lower portion 200b having a lower suspension arm 207, and a drive assembly 210. The bracket assembly 150b of the second embodiment 100b can be positioned within the main stationary ring 110. The hubless wheel system 100b is adapted for attachment onto a vehicle, such as a car, truck, motorcycle, or van, by any conventional means known in the art.

The drive assembly 210 can be attached to the outer ring 176, such that a vehicle tire T can be positively rotated. For example, the hubless wheel system 100b can be positioned within the front vehicle tires T of a front wheel drive vehicle, such as a car, or inside the rear vehicle tires T of a rear wheel drive vehicle so that the vehicle tires T having the hubless wheel system 100b can be positively rotated, such as by a power source (not shown), such as a motor.

Figure 4A:
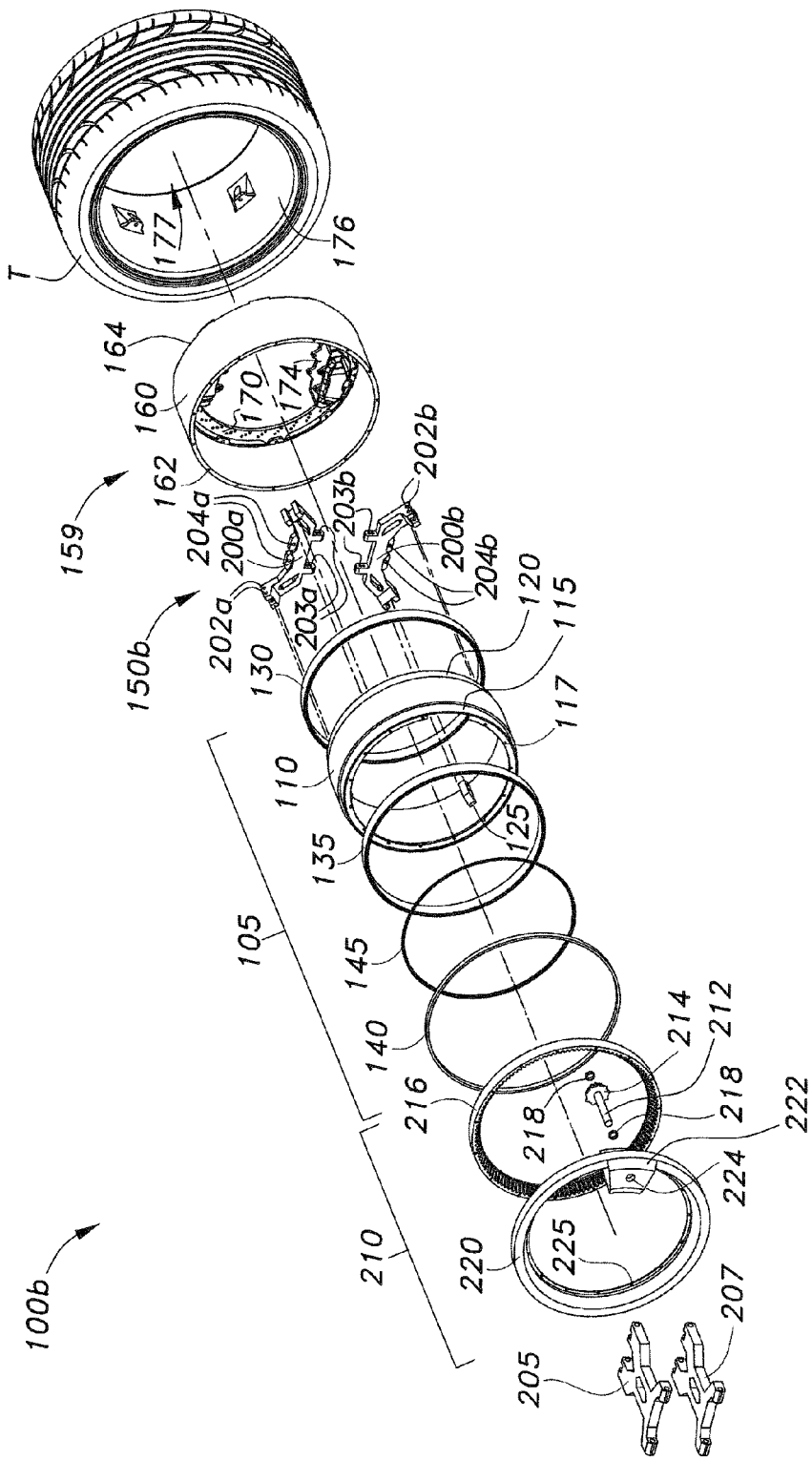
FIG. 4A is an exploded view of the inner ring assembly, a drive assembly, and another bracket assembly used in connection with a second embodiment of a hubless wheel system for motor vehicles, according to the present invention.
Figure 4B:
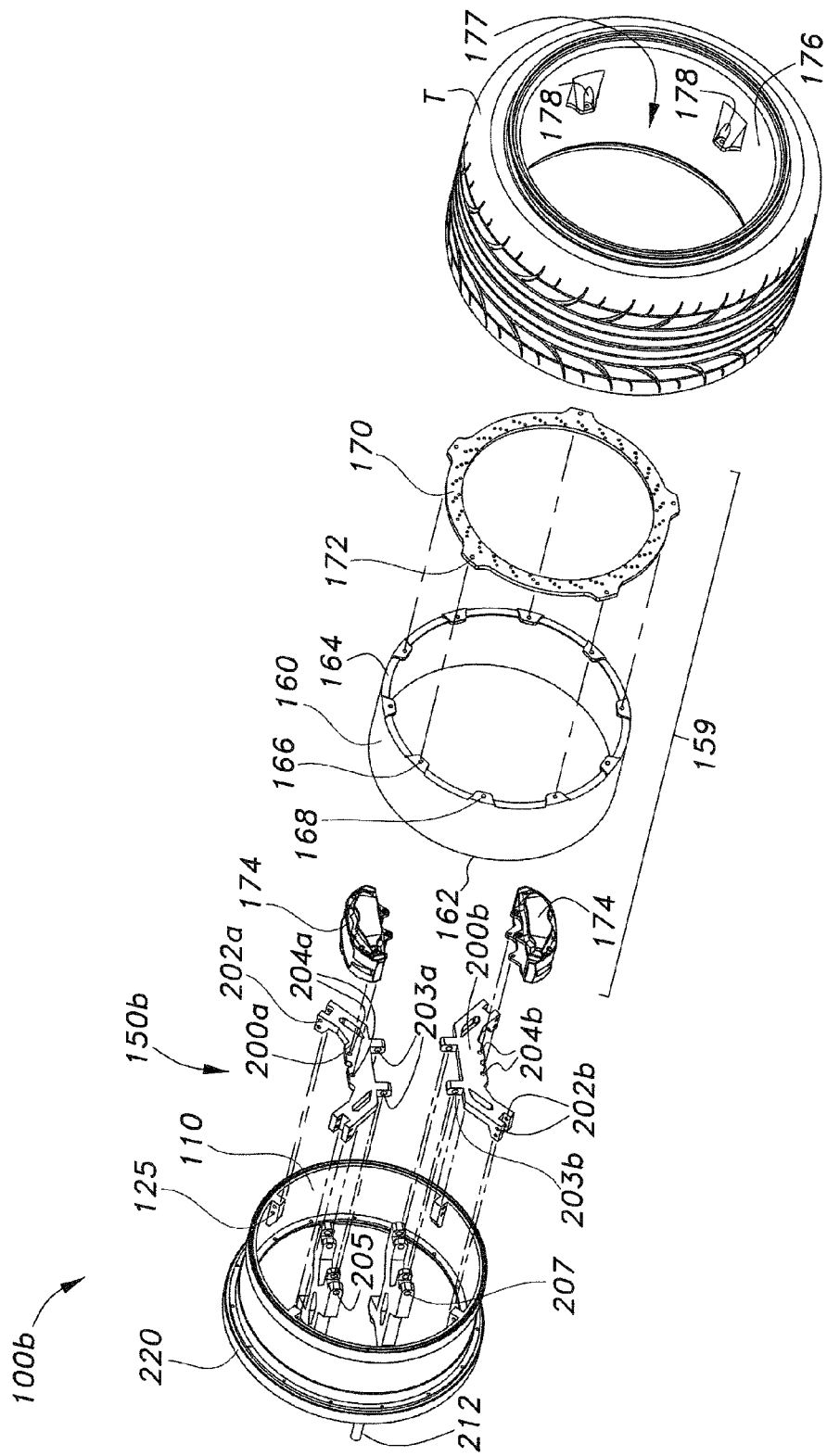
FIG. 4B is an exploded view of the middle ring assembly and another bracket assembly used in connection with a second embodiment of a hubless wheel system for motor vehicles, according to the present invention.
Figure 4C:
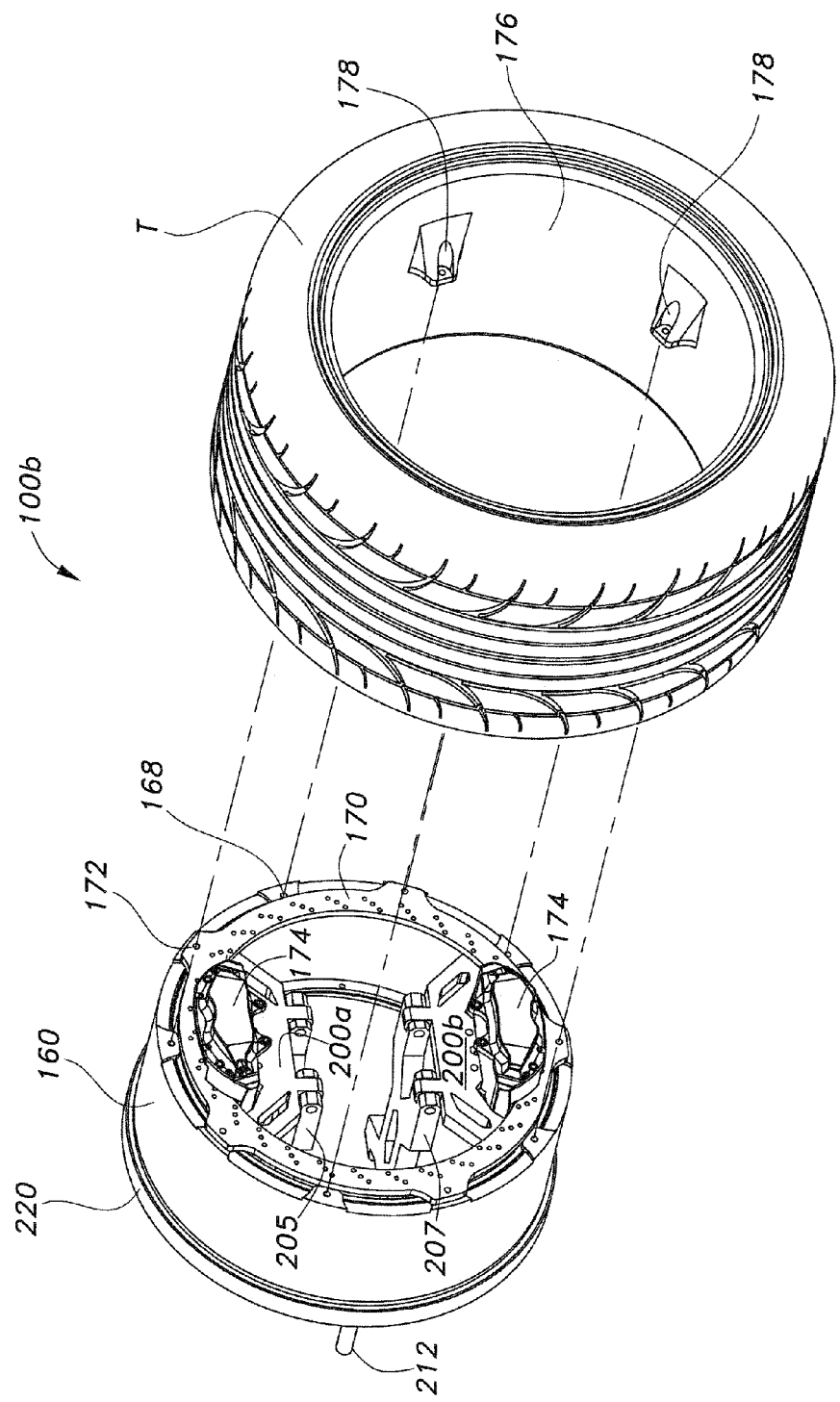
FIG. 4C is a view of the inner ring assembly positioned inside the middle ring assembly exploded away from an outer ring used in connection with a second embodiment of a hubless wheel system for motor vehicles, according to the present invention.

Referring to FIG. 4B, the upper portion 200a of the bracket assembly 150b is configured for mounting onto inner ring mounting brackets 125 positioned within the main stationary ring 110. The upper portion 200a includes a plurality of primary upper openings 202a, a plurality of upper coupling members 203a (desirably two upper coupling members 203a), and a plurality of secondary upper openings 204a. Each of the plurality of upper coupling members 203a is configured for pivotally coupling onto the upper suspension arm 205. Each of the plurality of primary upper openings 202a is configured to receive a fastener for attachment to a respective inner ring mounting bracket 125. Each of the plurality of secondary upper openings 204a is configured to receive a fastener to attach to the at least one disc brake caliper 174, so that the at least one disc brake caliper 174 can be positioned in communicating relation to the brake disc 170 and operate as described above.

The lower portion 200b of the bracket assembly 150b is configured for mounting onto an inner ring mounting bracket 125 positioned within the main stationary ring 110. The lower portion 200b of the bracket assembly 150b includes a plurality of primary lower openings 202b, a plurality of lower coupling members 203*b* configured for pivotally coupling onto the lower suspension arm 207, and a plurality of secondary lower openings 204*b*. Each of the plurality of primary lower openings 202*b* configured to receive a fastener to secure the lower portion 200*b* to the inner ring mounting bracket 125. Each of the plurality of secondary lower openings 204*b* is configured to receive a fastener to attach to the at least one disc brake caliper 174, so that the at least one disc brake caliper 174 can be positioned in communicating relation with the brake disc 170 and operate as described above.

The bracket assembly 150*b* of the second embodiment 100*b* can be attached and secured to the inner ring assembly 105 in a similar fashion as the bracket assembly 150*a* in the first embodiment 100*a*, described above. The suspension arms 205, 207 can be formed from any suitable material, such as a light-weight metal, and can be pivotally coupled to the plurality of upper coupling members 203*a* and to the plurality of lower coupling members 203*b*, respectively, such as by any suitable means known in the art so that each of the suspension arms 205, 207 can swing, such as in an upward and downward direction so as to provide stability and allow the vehicle tires T to move, such as in an upward direction and/or in a downward direction, along the surface of a road.

It is to be noted that, similar to the first embodiment 100*a*, the bracket assembly 150*b* can be configured for displaying an advertisement, logo, or brand, or for mounting a monitor (not shown), such as a water/dust proof monitor, configured for displaying an advertisement, logo, or brand, such as an aftermarket brand. For example, the advertisement, logo, or brand or the monitor can be coupled to the upper portion 200*a* and to the lower portion 200*b*, such as by any suitable means, so that the advertisement, logo, or brand can be displayed to individuals as the vehicle passes in a similar fashion as the first embodiment 100*a* described above.

The drive assembly 210 of the second embodiment 100*b* is configured for rotating the vehicle tire T. The drive assembly 210 includes a drive shaft 212 and an annular rack 216 that can be mounted on the inner portion 177 of the outer ring 176. The drive shaft 212 has a gear 214, such as a pinion gear, positioned in fluid communication with the annular rack 216. The annular rack 216 is configured to provide a rotating force to the vehicle tire T so that the vehicle tire T rotates on the bearings 130,135 about main stationary ring 110 of the inner ring assembly 105. It is to be noted that the drive assembly 210 can also include a plurality of bearings 218, such as ball bearings configured to aid in the rotation of the drive shaft 212.

Referring to FIG. 4A, the drive assembly 210 can include a cover 220 configured to cover the annular rack 216 and prevent, such as substantially prevent, any elements, such as dirt, mud, and/or water, from coming into contact with and damaging the annular rack 216. The cover 220 can include a gear box 222 so as to protect, such as substantially protect, the drive shaft 212, the gear 214, and the bearings 218 from any elements, such as dirt, mud, and/or water. The gear box 222 can include a drive shaft opening 224 through which the drive shaft 212 can extend so as to communicate with the power source, such as the engine, that can rotate the drive shaft 212 so that the vehicle tire T can be actively rotated. For example, as the power source (not shown) rotates the drive shaft 212, the drive shaft 212 can rotate the gear 214 that can, in turn, rotate the annular rack 216, such as through a channel 225 within the cover 220, so as to rotate the vehicle tire T about the main stationary ring 105 having the bracket assembly 150*b* of the second embodiment 100*b*. It is to be noted that the gear box 222 can be filled with lubricating oil so as to maintain the gear 214 and the bearings 218 lubricated and reduce friction between the gear 214 and the annular rack 216.

By way of operation, after the inner ring assembly 105 and the middle ring assembly 159 have been assembled and inserted into the outer ring 176, such as in a coaxial arrangement, and the bracket assembly 150*b* secured to the main stationary ring 105, such as in a similar fashion as in the first embodiment 100*a* (FIGS. 3A and 3B), the drive shaft 212 of each vehicle tire T having the second embodiment 100*b* can be connected to the power source, such as an engine, configured to rotate the drive shaft 212. The rotating drive shaft 212 can, in turn, rotate the gear 214 so as to rotate the annular rack 216 attached to the outer ring 176 coupled to the vehicle tire T, such as in a forward direction or in a rearward direction, about the main stationary ring 105.

Figure 5A:
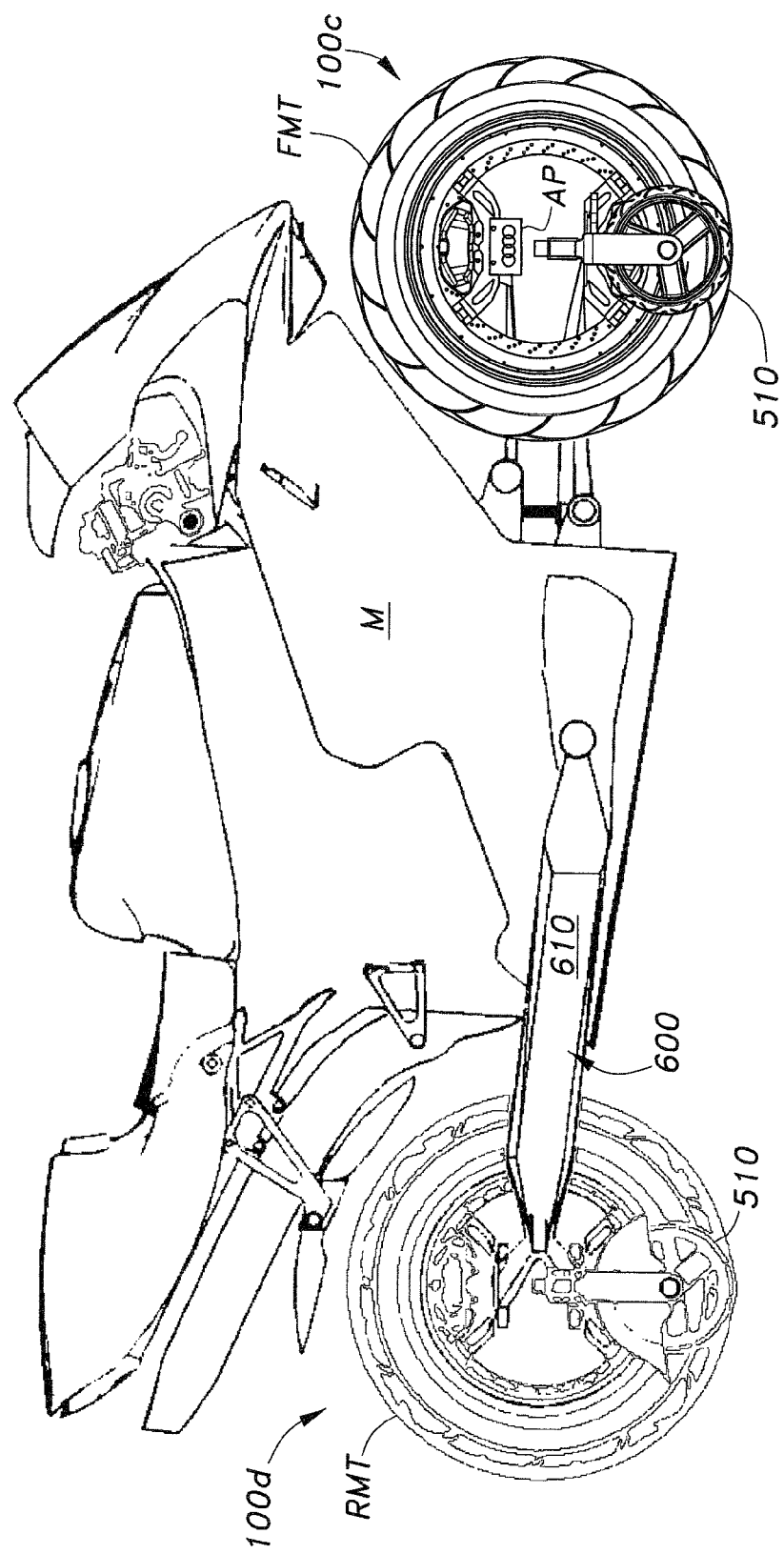
FIG. 5A is a side view of a motorcycle having a third embodiment of a hubless wheel system for motor vehicles positioned within a front motorcycle tire and a fourth embodiment of a hubless wheel system for motor vehicles positioned with a rear motorcycle tire, according to the present invention.
Figure 5B:
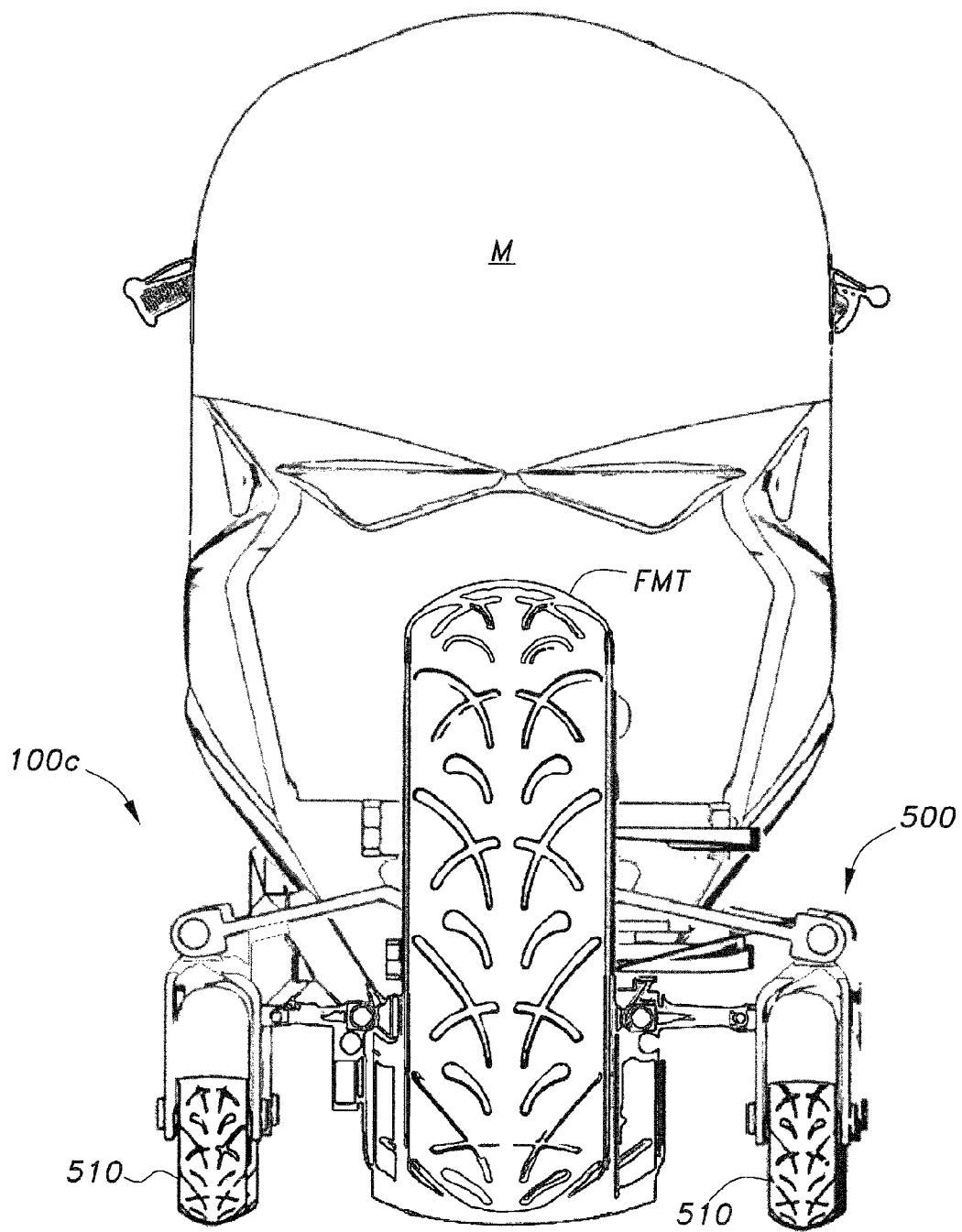
FIG. 5B is a front view of a motorcycle illustrating a front motorcycle tire having a side wheel assembly, according to the present invention.
Figure 5C:
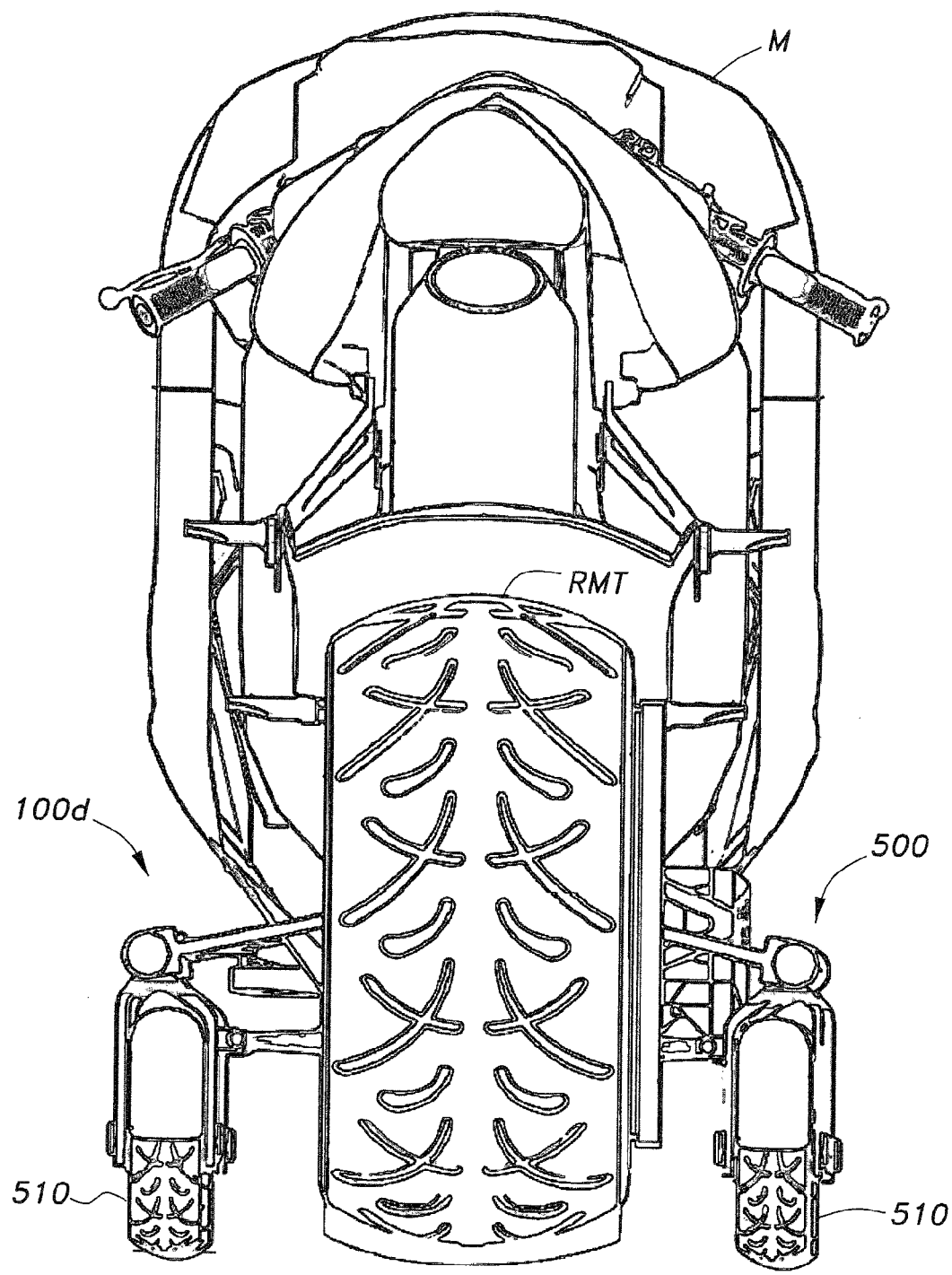
FIG. 5C is a rear view of a motorcycle illustrating a rear motorcycle tire having a side wheel assembly, according to the present invention.

FIGS. 5A-11C depict a third embodiment 100*c* and a fourth embodiment 100*d* of the hubless wheel system, generally designated as 100*c* and 100*d*, respectively. The hubless wheel system 100*c* and 100*d* are substantially similar to the first embodiment 100*a* and to the second embodiment 100*b*, respectively, however, the third embodiment 100*c* and the fourth embodiment 100*d* are adapted for attachment onto a motorcycle, such as in connection with a front motorcycle tire FMT and a rear motorcycle tire RMT, respectively, as illustrated in FIGS. 5A-5C.

Referring to FIGS. 6A-8B, similar to the first embodiment 100*a* and the second embodiment 100*b* described above, the third embodiment 100*c* includes the inner ring assembly 105 having the main stationary ring 110, the middle ring assembly 159, and the outer ring 176. However, the third embodiment 100*c* also includes a bracket assembly 150*c*, and a side wheel assembly 500, as well as a suspension assembly 520 and a step-lock assembly 530 positioned in communicating relation with side wheel assembly 500, wherein the side wheel assembly 500 can be positioned within the bracket assembly 150*c* of the third embodiment 100*c* positioned within the front motorcycle tire FMT.

Similar to the bracket assembly 150*b*, the bracket assembly 150*c* (FIG. 7A) of the third embodiment 100*c* can be positioned within the main stationary ring 110 and includes two members, such as an upper portion 300*a* and a lower portion 300*b*. The upper portion 300*a* includes a plurality of upper openings 302*a*, a plurality of primary upper attachment members 304 (preferably two primary upper attachment members 304) configured for securing the at least one disc brake caliper 174, and a plurality of secondary upper attachment members 309 (preferably two secondary upper attachment members 309) (FIGS. 6C, 7A, and SA) configured for mounting an advertising plate AP, as illustrated in FIG. 5A. The lower portion 300*b* includes a plurality of lower openings 302*b* and a plurality of lower attachment members 305 (FIG. 7B) (preferably two lower attachment members 305) configured for securing the side wheel assembly 500, as described further below. The lower portion 300*b* of the bracket assembly 150*c* of the third embodiment 100*c* can also include an attachment member 307 configured to mount onto the suspension assembly 520, such as for additional support. Each of the plurality of upper openings 302*a* and lower openings 302*b* can be mounted onto a corresponding inner ring mounting bracket 125 positioned within the main stationary ring 110 so as to secure the upper portion 300*a* and the lower portion 300*b*, respectively, of the bracket assembly 150*c* of the third embodiment 100*c*.

Figure 8B:
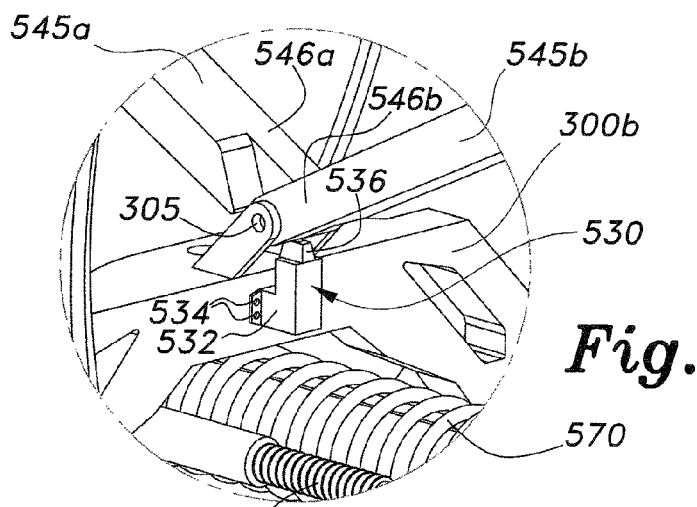
FIG. 8B is an exploded view of a step-lock assembly for use in connection with a third embodiment of a hubless wheel system, according to the present invention.
Figure 8A:
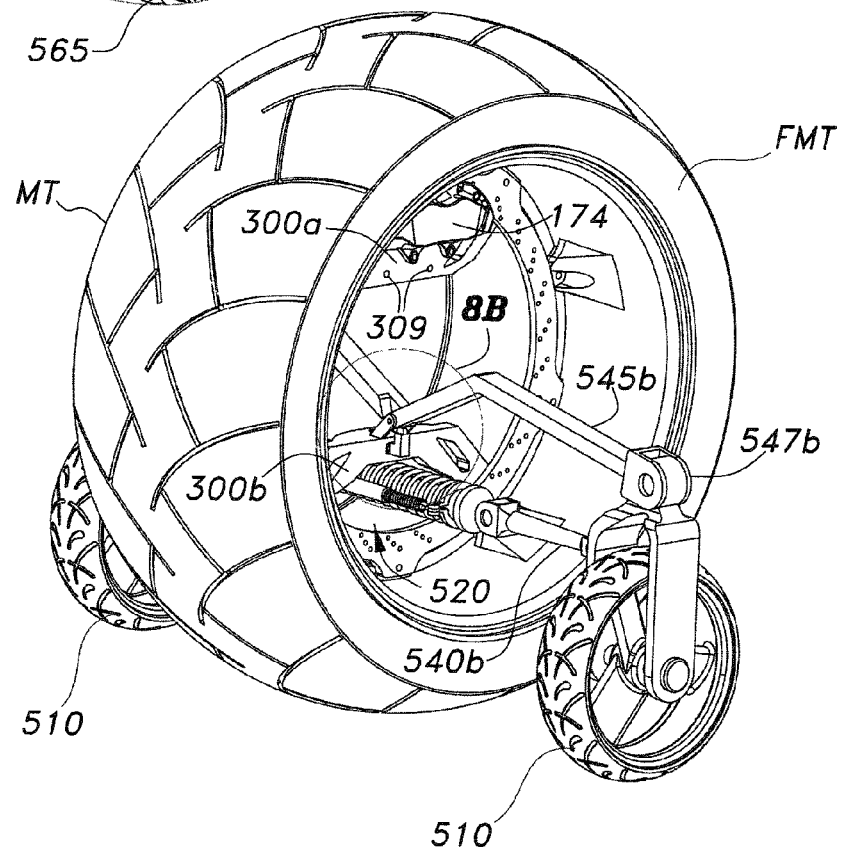
FIG. 8A is a side, perspective view of a front motorcycle tire having a third embodiment of a hubless wheel system, according to the present invention.
Figure 8C:
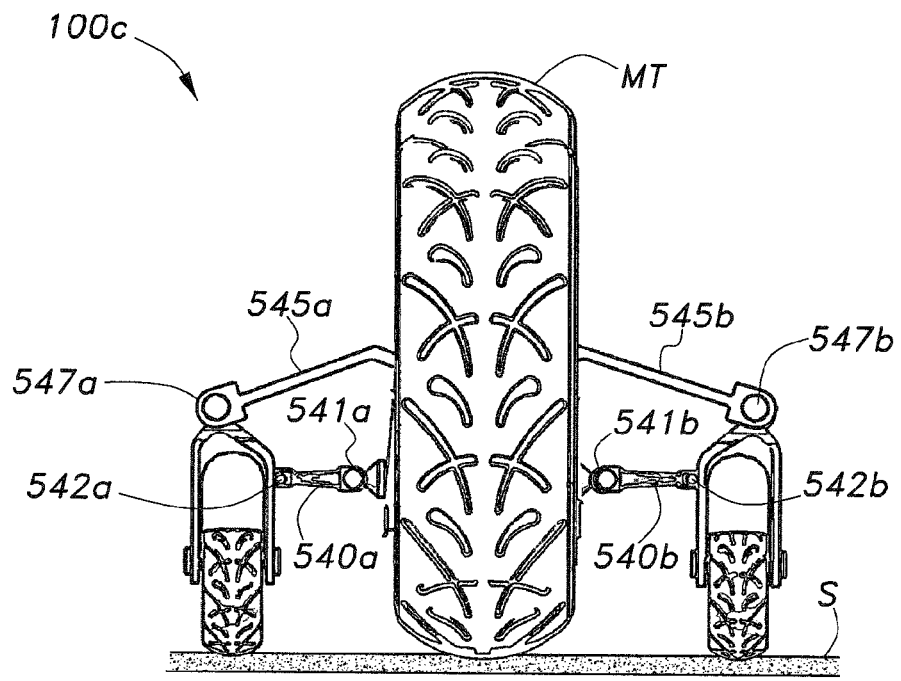
FIG. 8C is a view illustrating a side wheel assembly wherein the motorcycle tire is on a level surface with the side wheels, according to the present invention.
Figure 8D:
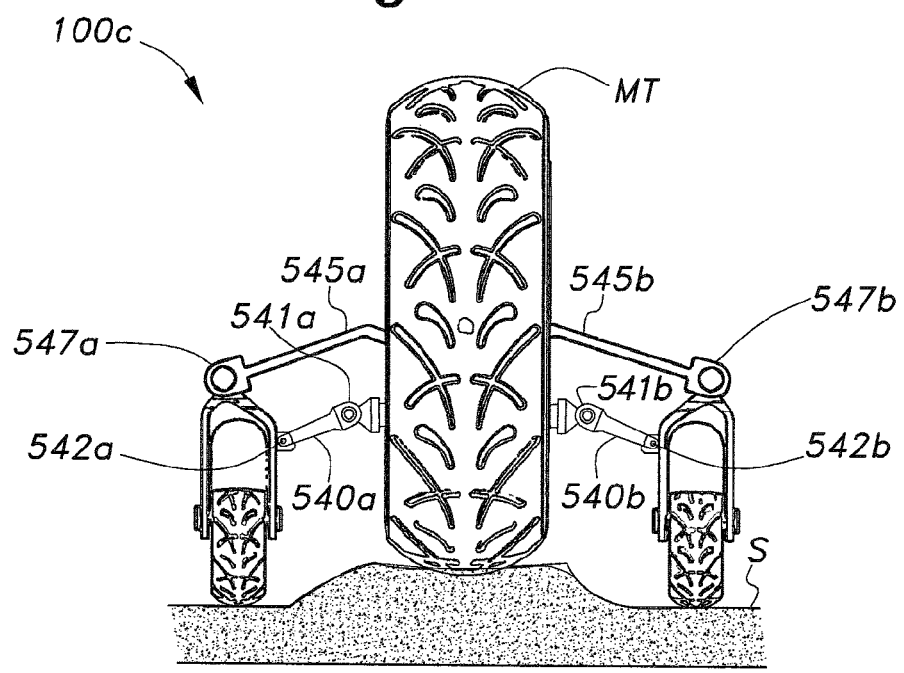
FIG. 8D is a view illustrating a side wheel assembly wherein the motorcycle tire is on a higher surface than the side wheels, according to the present invention.

The side wheel assembly 500 positioned within the bracket assembly 150*c* of the third embodiment 100*c* can include a plurality of side wheels 510 (preferably two side wheels 510), a plurality of wheel forks, such as a first wheel fork 515a and a second wheel fork 515b, each wheel fork 515a, 515b configured to hold one of the plurality of side wheels 510, a plurality of leaning arms, such as first leaning arm 545a having a first inner side 546a and a first outer side 547a and a second learning arm 545b having a second inner side 546b and a second outer side 547b, configured to pivotally connect each of the plurality of wheel forks 515a, 515b to the lower portion 300b of the bracket assembly 150c of the third embodiment 100c, as illustrated in FIGS. 8A and 8B, and a plurality of tow arms, such as a first tow arm 540a having a first inner end 541a and a first outer end 542a and second tow arm 540b having a second inner end 541b and a second outer end 542b, configured to pivotally connect each of the plurality of wheel forks 515a, 515b to the suspension assembly 520.

For example, the first inner side 546a of the first leaning arm 545a and the second inner side 546b of the second leaning arm 545b can each be pivotally coupled to one of the plurality of lower attachment members 305 of the lower portion 300b of the bracket assembly 150c of the third embodiment 100c and the first outer side 547a of the first leaning arm 545a and the second outer side 547b of the second leaning arm 545b can each be pivotally coupled to a corresponding wheel fork 515a, 515b. For example, the first outer side 547a of the first leaning arm 545a can be pivotally coupled to the first wheel fork 515a and the second outer side 547b of the second leaning arm 545b can be pivotally coupled to the second wheel fork 515b.

Figure 8E:
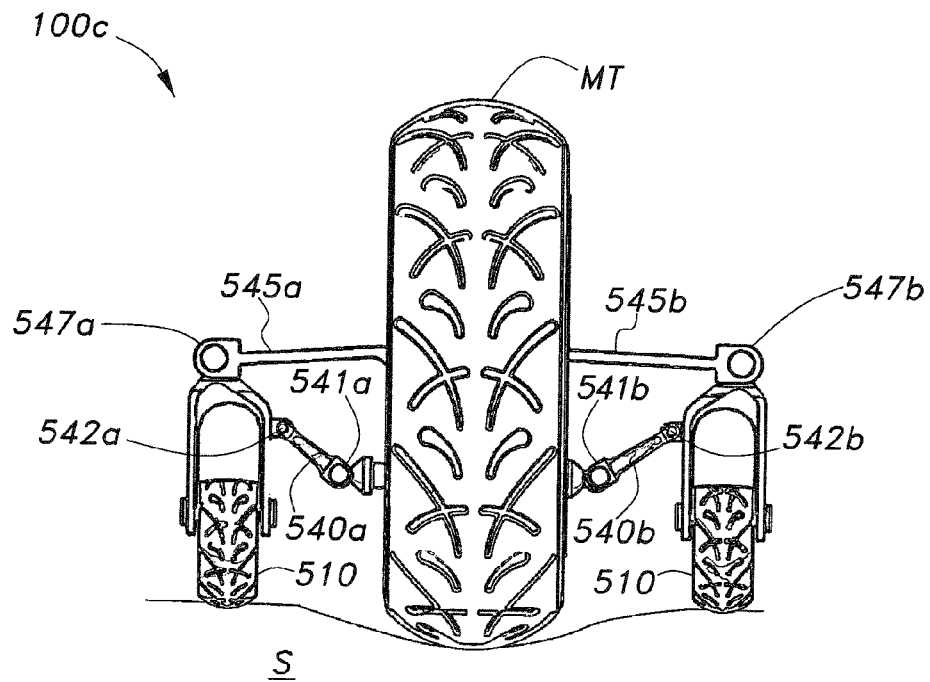
FIG. 8E is a view illustrating a side wheel assembly wherein the motorcycle tire is on a lower surface than the side wheels, according to the present invention.
Figure 8F:
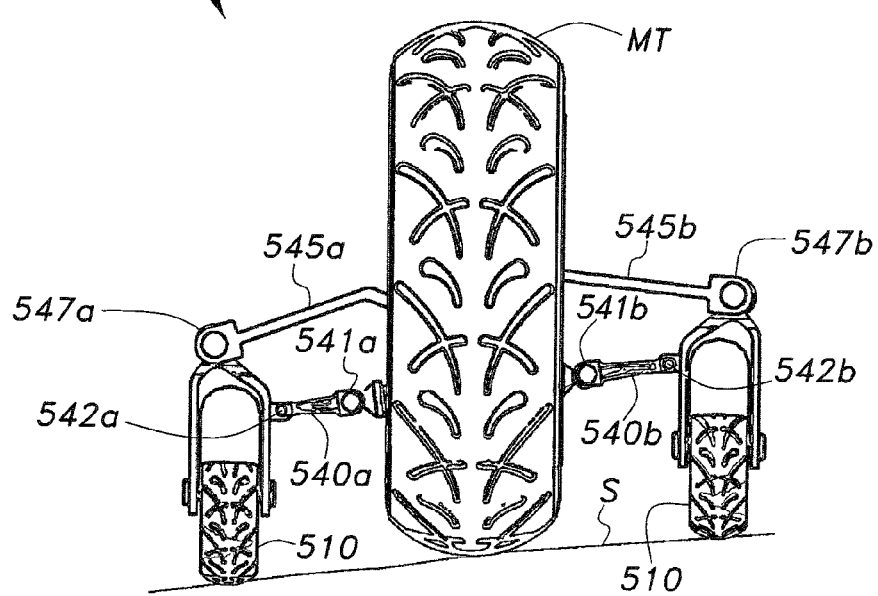
FIG. 8F is a view illustrating a side wheel assembly wherein the side wheels and the motorcycle tire are on an upward sloping surface, according to the present invention.
Figure 8G:
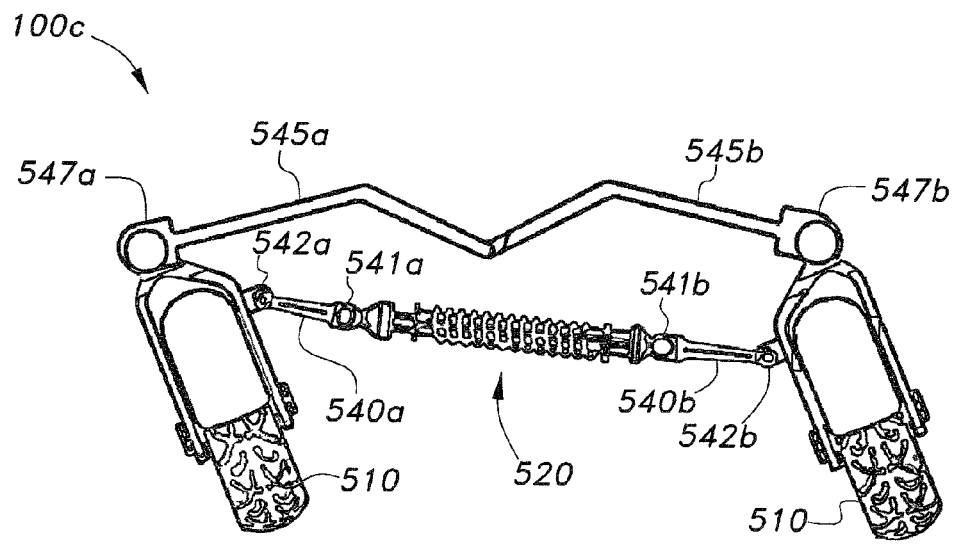
FIG. 8G is an illustration of the side wheels of a side wheel assembly leaning toward the left, according to the present invention.
Figure 8H:
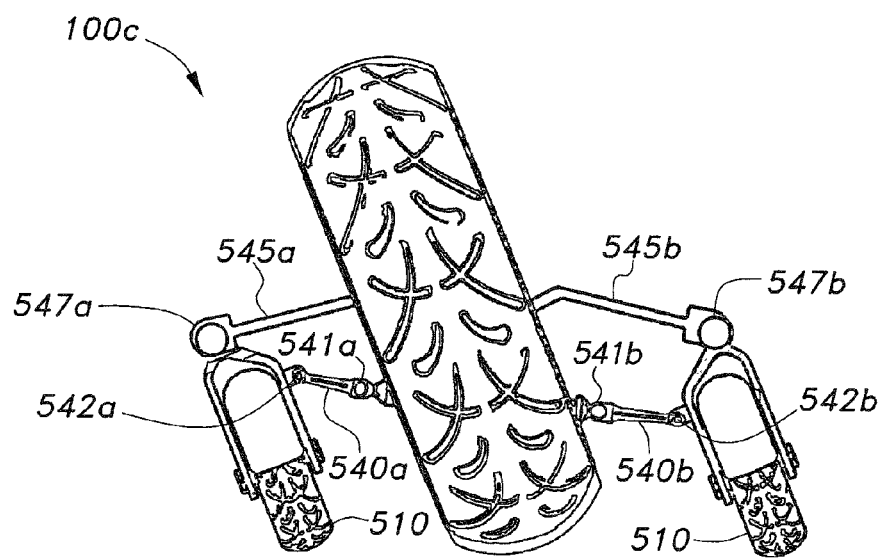
FIG. 8H is an illustration of the motorcycle tire and the side wheels of a side wheel assembly leaning toward the left, according to the present invention.

It is to be noted that once pivotally coupled the lower portion 300b of the bracket assembly 150c of the third embodiment 100c the leaning arms 545a, 545b can only move in an upward or downward direction and, as such, the leaning arms 545a, 545b can be configured to put sufficient downward pressure on each of the plurality of side wheels 510 so as to maintain a better grip on the pavement despite whether the motorcycle tire MT is traveling on a level surface S with the side wheels 510 (FIG. 8C), on a higher surface S than the side wheels 510 (FIG. 8D), or on a lower surface S than the side wheels (FIG. 8E). The leaning arms 545a, 545b can also aid the side wheels 510 in maintaining a better grip on an upward sloping surface S (FIG. 8F). By keeping the side wheels 510 firmly on the surface S, the leaning arms 545a, 545b can improve maneuverability at both lower and higher speeds, as well as the ride on wet and/or sandy surfaces.

Figure 7A:
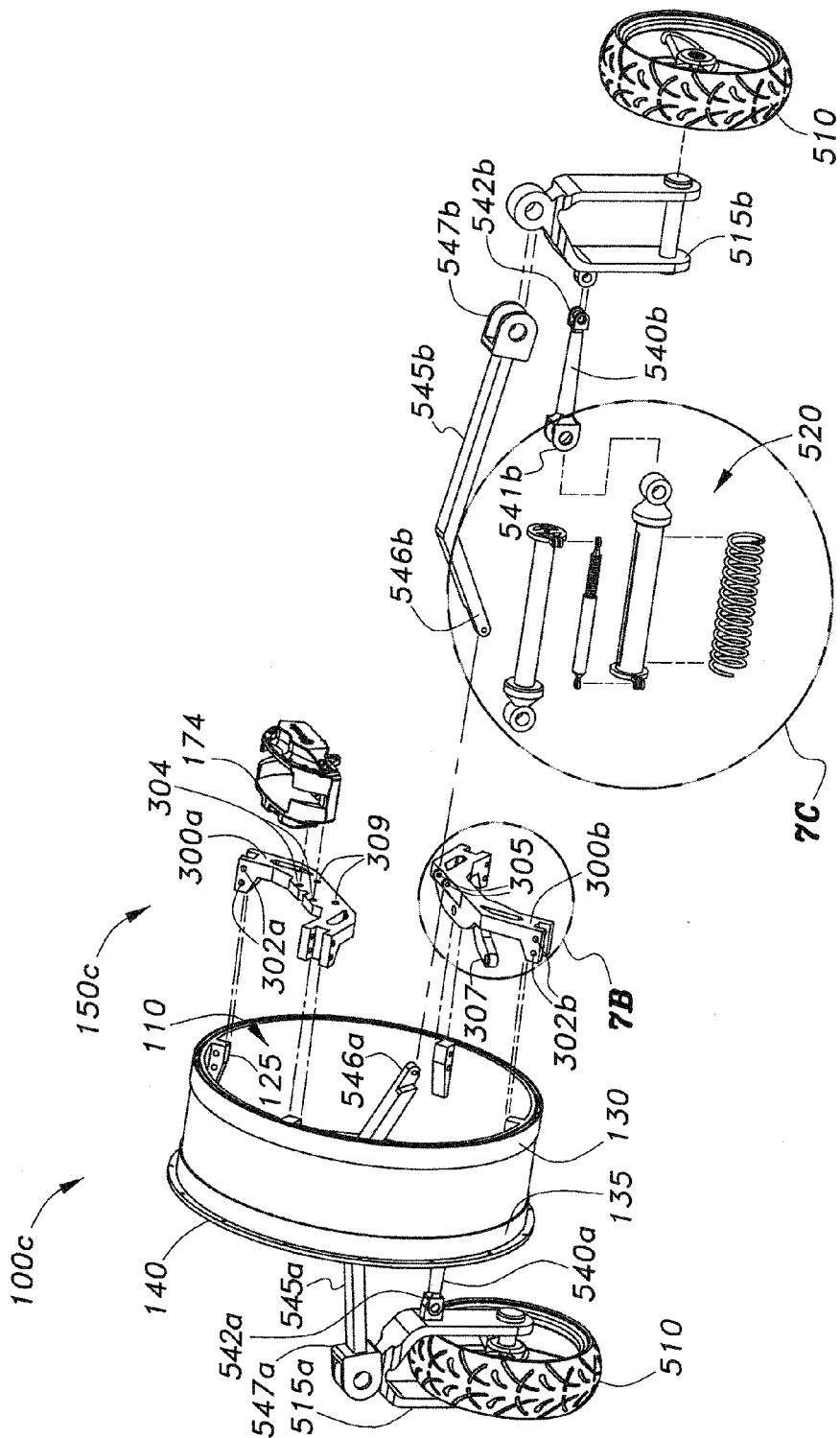
FIG. 7A is an exploded view of a side wheel assembly used in connection with the third and fourth embodiments of a hubless wheel system, according to the present invention.
Figure 7B:
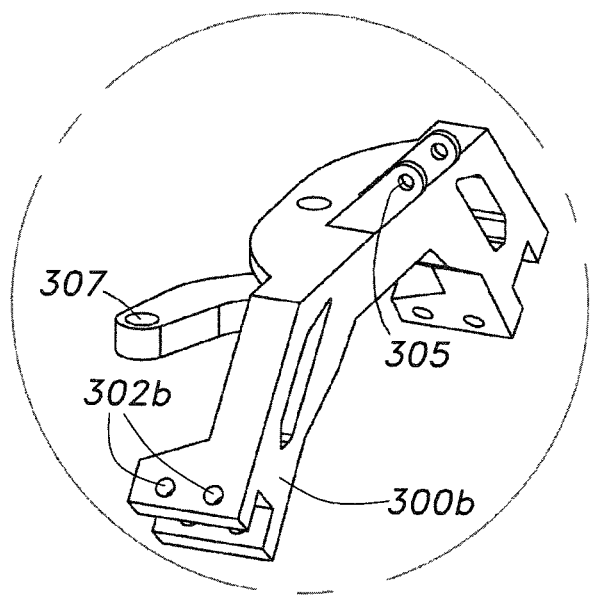
FIG. 7B is an exploded view of a lower portion of another bracket assembly used in connection with a third embodiment of a hubless wheel system, according to the present invention.
Figure 7C:
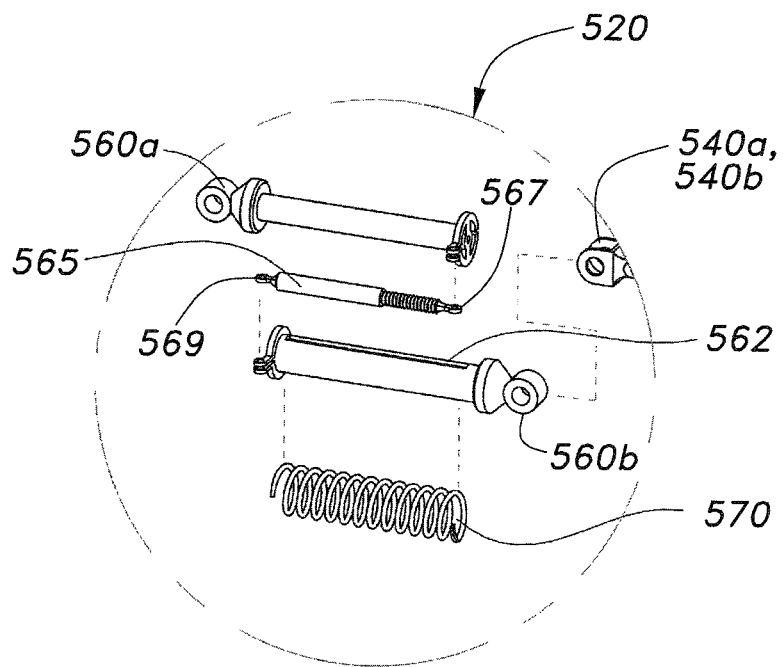
FIG. 7C is an exploded view of a suspension assembly used in connection with third and fourth embodiments of a hubless wheel system, according to the present invention.

Referring to FIGS. 7A and 7C, the suspension assembly 520 can include a first portion 560a that can be pivotally coupled to the first inner end 541a of the first tow arm 540a, a second portion 560b that can be pivotally coupled to the second inner end 541b of the second tow arm 540b, the second portion 560b having an adjustment slot 562, the first portion 560a being positioned within the second portion 560b, a resilient member 570, such as a coil spring or a leaf spring, positioned on the second portion 560b of the suspension assembly 520, and a damper 565, such as a shock absorber, having a first side 567 coupled to the first portion 560a and a second side 569 coupled to the second portion 560b so as to maintain the suspension assembly 520 in a closed, such as in a substantially closed position. The shock absorber 565 being configured to reduce, such as substantially reduce, any impacts from obstacles, such as rocks and tree limbs, on the road so as to make the ride as smooth as possible. It is to be noted that the first outer end 542a of the first tow arm 540a and the second outer end 542b of the second tow arm 540b can pivotally couple the suspension assembly 520 to the corresponding wheel fork, such as to the first wheel fork 515a and to the second wheel fork 515b, respectively, as illustrated in FIGS. 8C-8J.

Figure 8I:
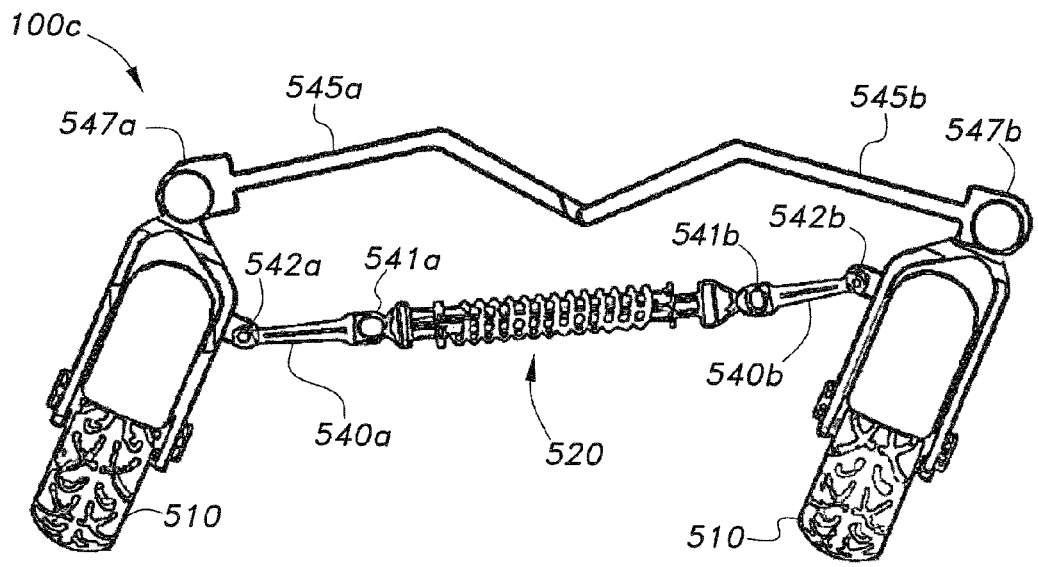
FIG. 8I is an illustration of the side wheels of a side wheel assembly leaning toward the right, according to the present invention.
Figure 8J:
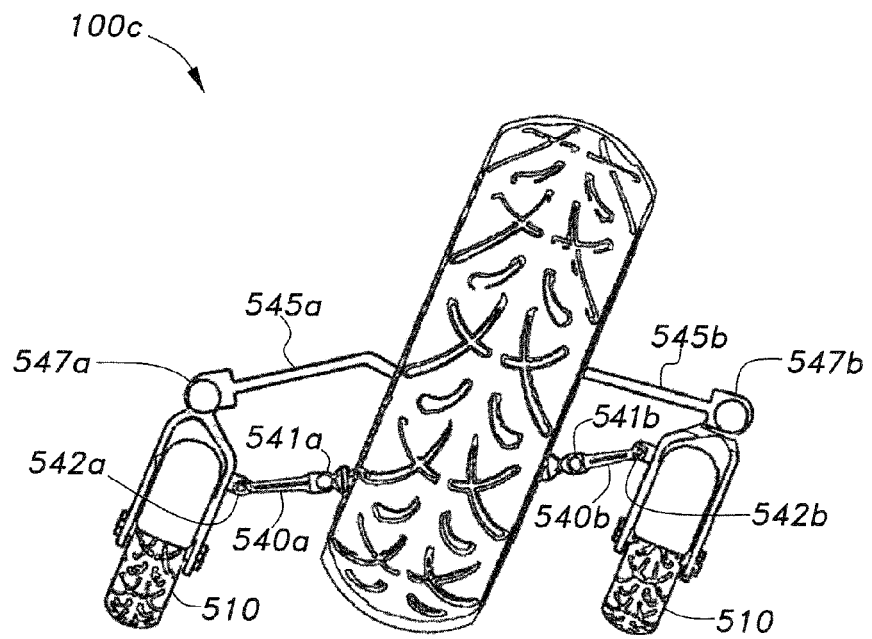
FIG. 8J is an illustration of the motorcycle tire and the side wheels of a side wheel assembly leaning toward the right, according to the present invention.

It is to be understood that in a closed position the distance between the first tow arm 540a and the second tow arm 540b can be at a minimum (as opposed to an open position as for many conventional suspension assemblies where the distance is at a maximum) so that when the side wheels 510 are forced apart due to road conditions the resilient member 570 will expand accordingly and subsequently contract so as to pull the side wheels 510 back to the initial position in which the resilient member 570 is compressed and the distance between the first tow arm 540a and the second tow arm 540b is at a minimum. This can allow the side wheels 510 to tilt in the same direction as the front motorcycle tire FMT and the rear motorcycle tire RMT, such as to the left (FIGS. 8G-8H) and/or to the right (FIGS. 8I-8J). Further, by maintaining a given distance between the side wheels 510, the suspension assembly can aid the side wheels 510 in turning along with the front motorcycle tire FMT, such as to the right (FIG. 9A) and/or to the left (FIG. 9B).

The step-lock assembly 530 (FIGS. 8A-8B) includes a locking member 532, e.g., a stepped-lock-solenoid that can be electronically controlled in relation to the motorcycle's speed. The locking member 532 can be fully locked when the motorcycle is in a stopped position or can be partially locked when the motorcycle is moving at low speed. The step-lock assembly 530 has a first end 534 coupled to the lower portion 300b of the bracket assembly 150c of the third embodiment 100c and a second end 536 positioned in communicating relation with side wheel assembly 500, such as the second leaning arm 545b. The step-lock assembly 530 can control the tilting of each side wheel 510, such as in a semi-lock position, so the driver can maneuver more confidently by reducing the risk of falling over when making turns at low speeds. Further, the step-lock assembly 530 can also prevent, such as substantially prevent, the motorcycle from tipping over when the motorcycle is fully stopped, such as in a full-lock position.

Figure 6A:
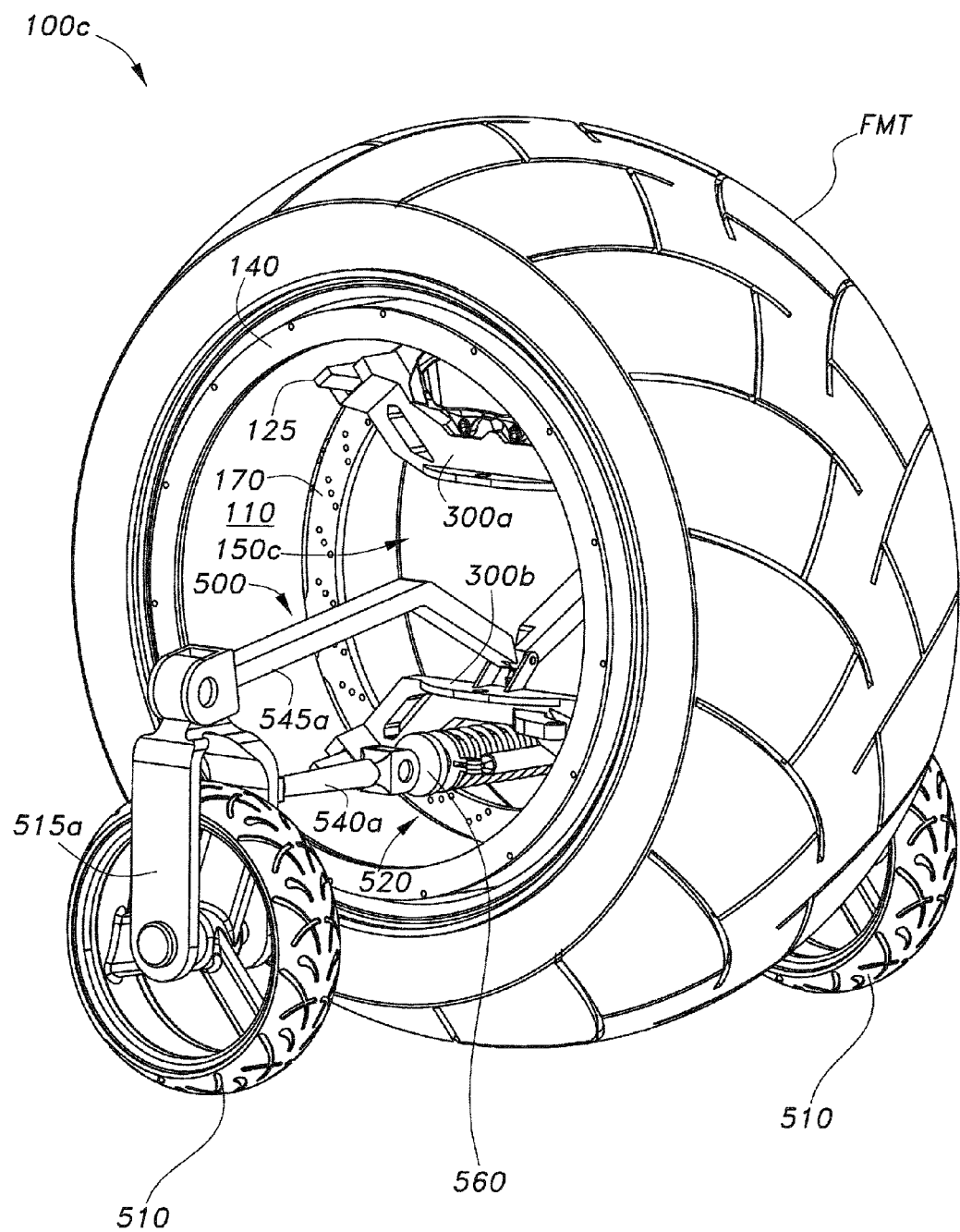
FIG. 6A is a side, perspective view of a front motorcycle tire having the third embodiment of a hubless wheel system, according to the present invention.
Figure 6B:
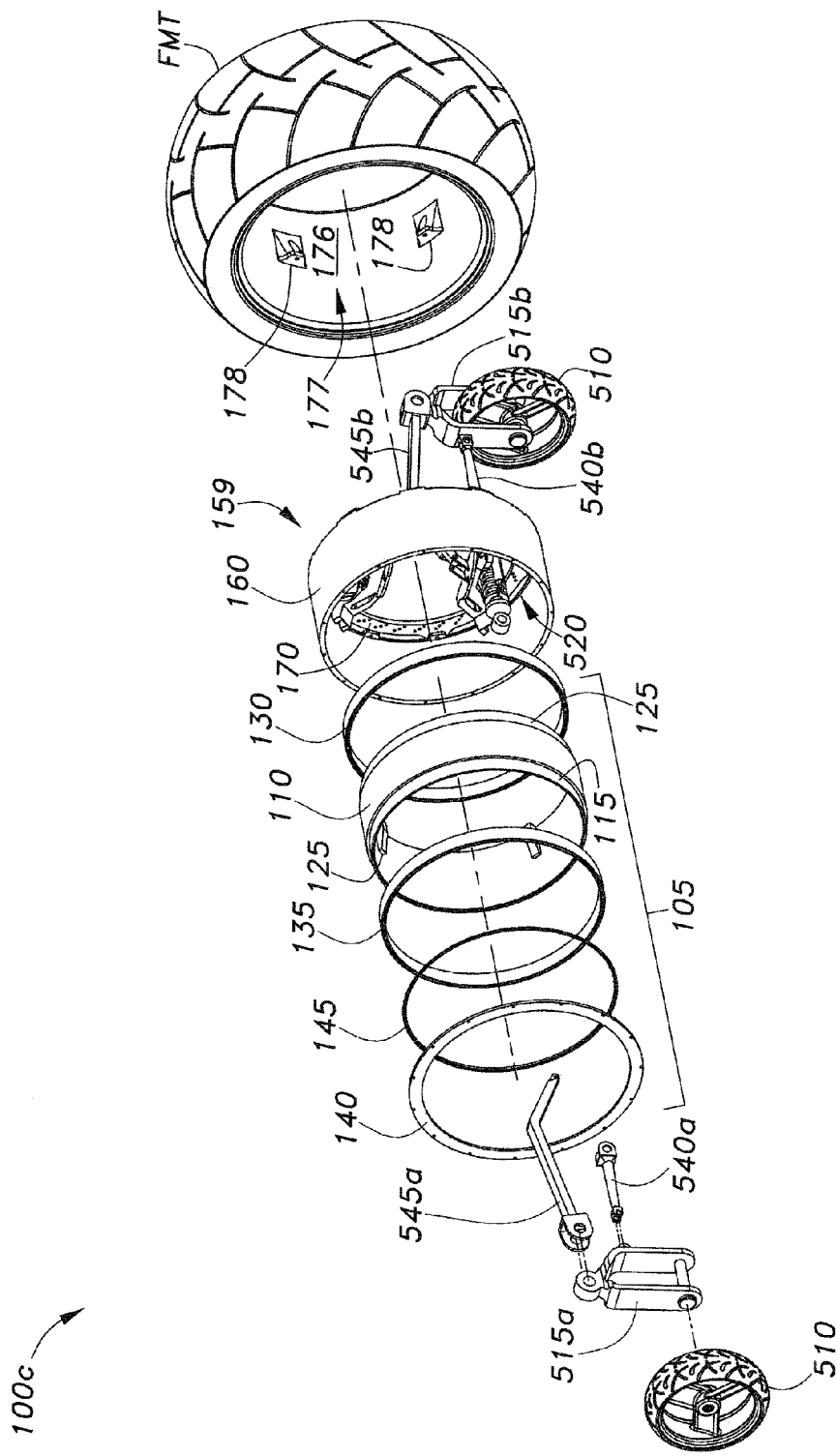
FIG. 6B is an exploded view of an inner ring assembly and a side wheel assembly used in connection with the third embodiment of a hubless wheel system for motor vehicles, according to the present invention.
Figure 6C:
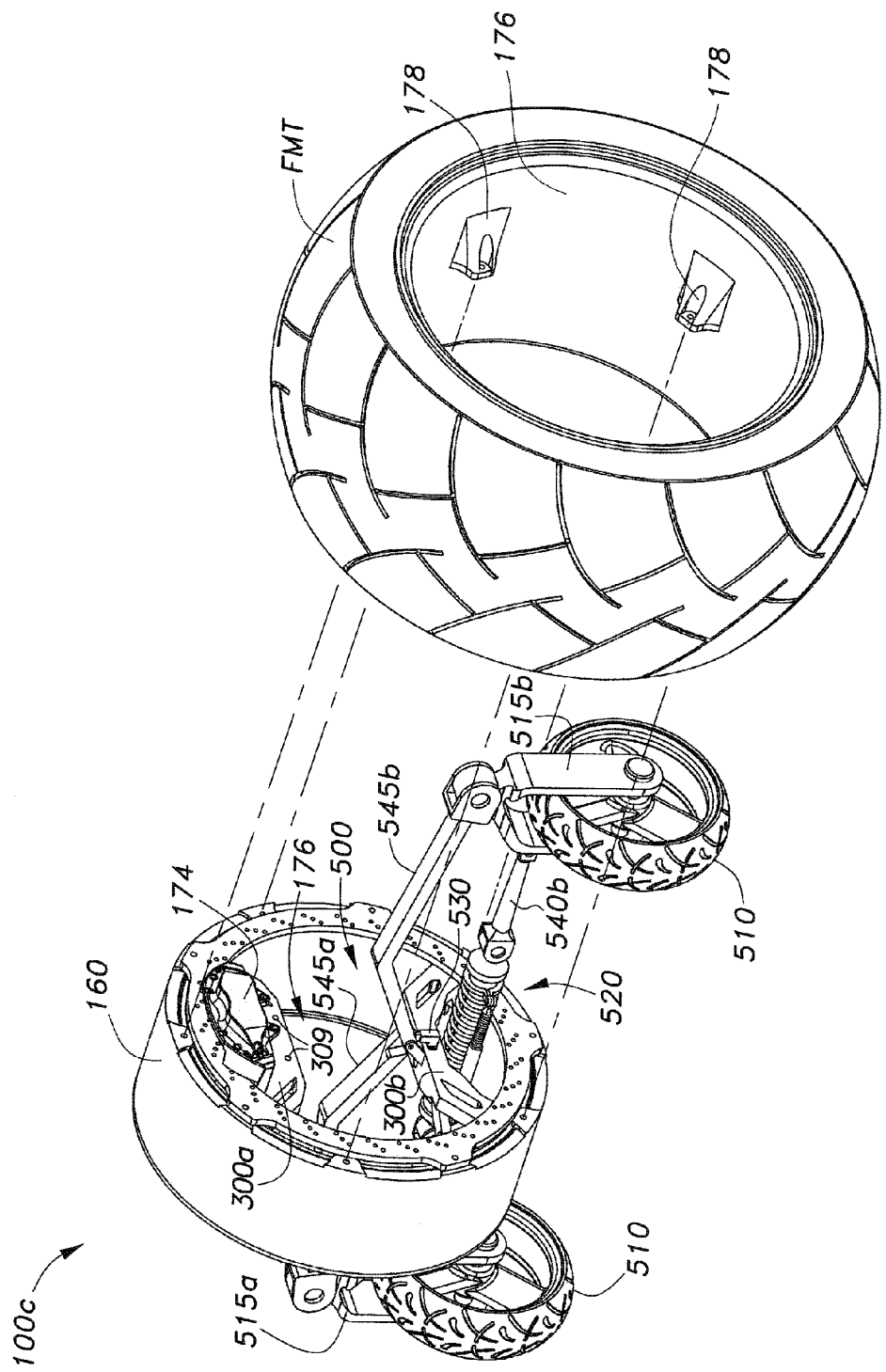
FIG. 6C is a view illustrating the middle ring assembly mounted onto the inner ring assembly having a side wheel assembly positioned inside the inner ring assembly exploded away from an outer ring used in connection with a third embodiment of a hubless wheel system for a front motorcycle tire, according to the present invention.

By way of operation, once the upper portion 300a and the lower portion 300b of the bracket assembly 150c of the third embodiment 100c have been secured to the main stationary ring 110 of the inner ring assembly 105 and the inner ring assembly 105 has been positioned within the middle ring assembly 159, as described above, the side wheel assembly 500 can be secured to the lower portion 300b of the bracket assembly 150c of the third embodiment 100c, such as by any suitable means, the suspension assembly 520 can be pivotally attached to the first wheel fork 515a and to the second wheel fork 515a, and the step-lock assembly 530 can be attached, such as by any suitable means, to the lower portion 300b of the bracket assembly 150c of the third embodiment 100c, as illustrated in FIG. 6C. Subsequently, the middle ring assembly 159 can be inserted and secured to the outer ring 176, such as the outer ring 176 of the front motorcycle tire FMT, in a similar fashion as the first embodiment 100a and the second embodiment 100b, described above.

Figure 9A:
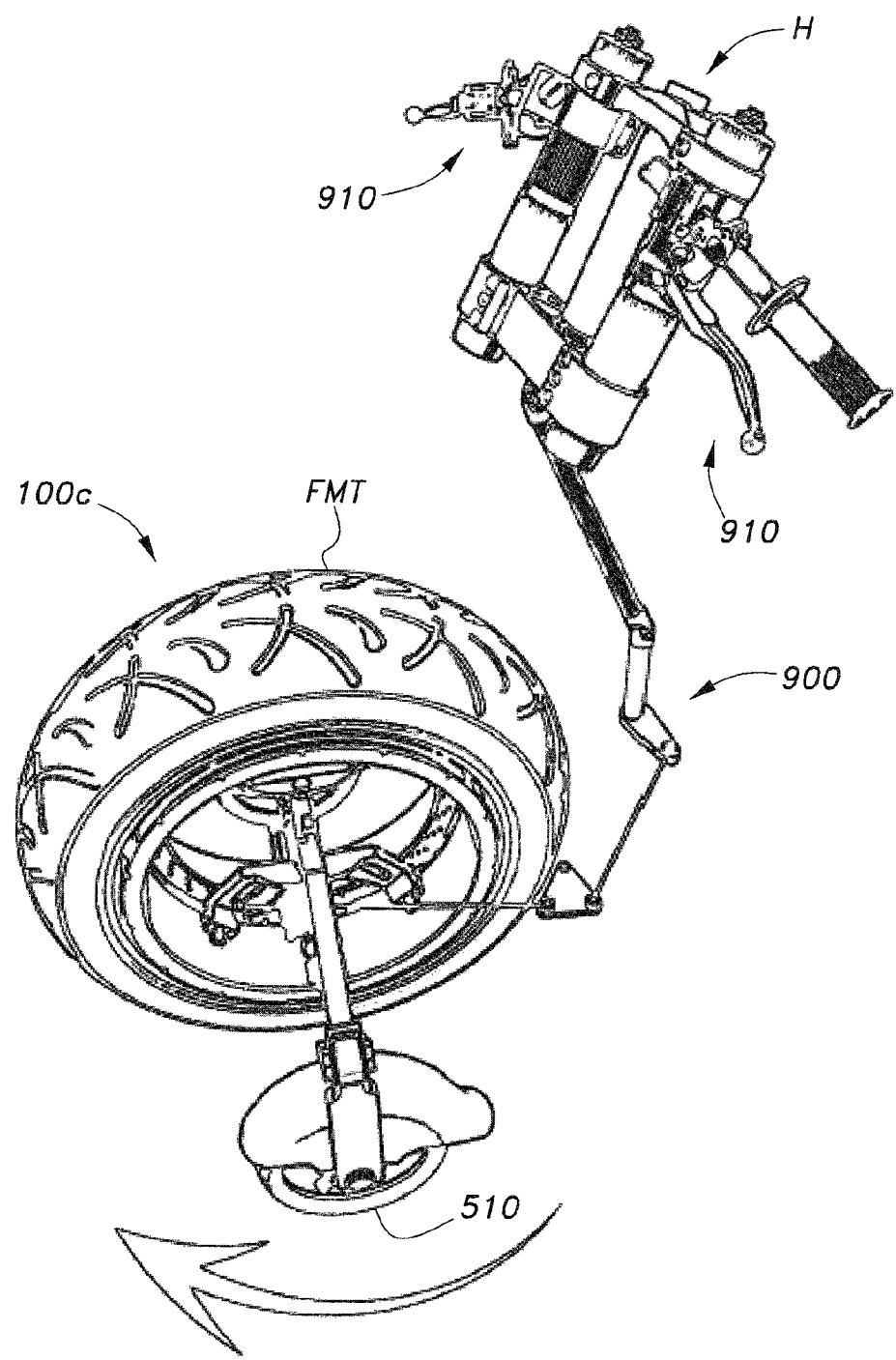
FIG. 9A is an illustration of a steering mechanism coupled to a third embodiment of a hubless wheel system positioned within a front motorcycle tire, wherein the front motorcycle tire is turning to the right, according to the present invention.
Figure 9B:
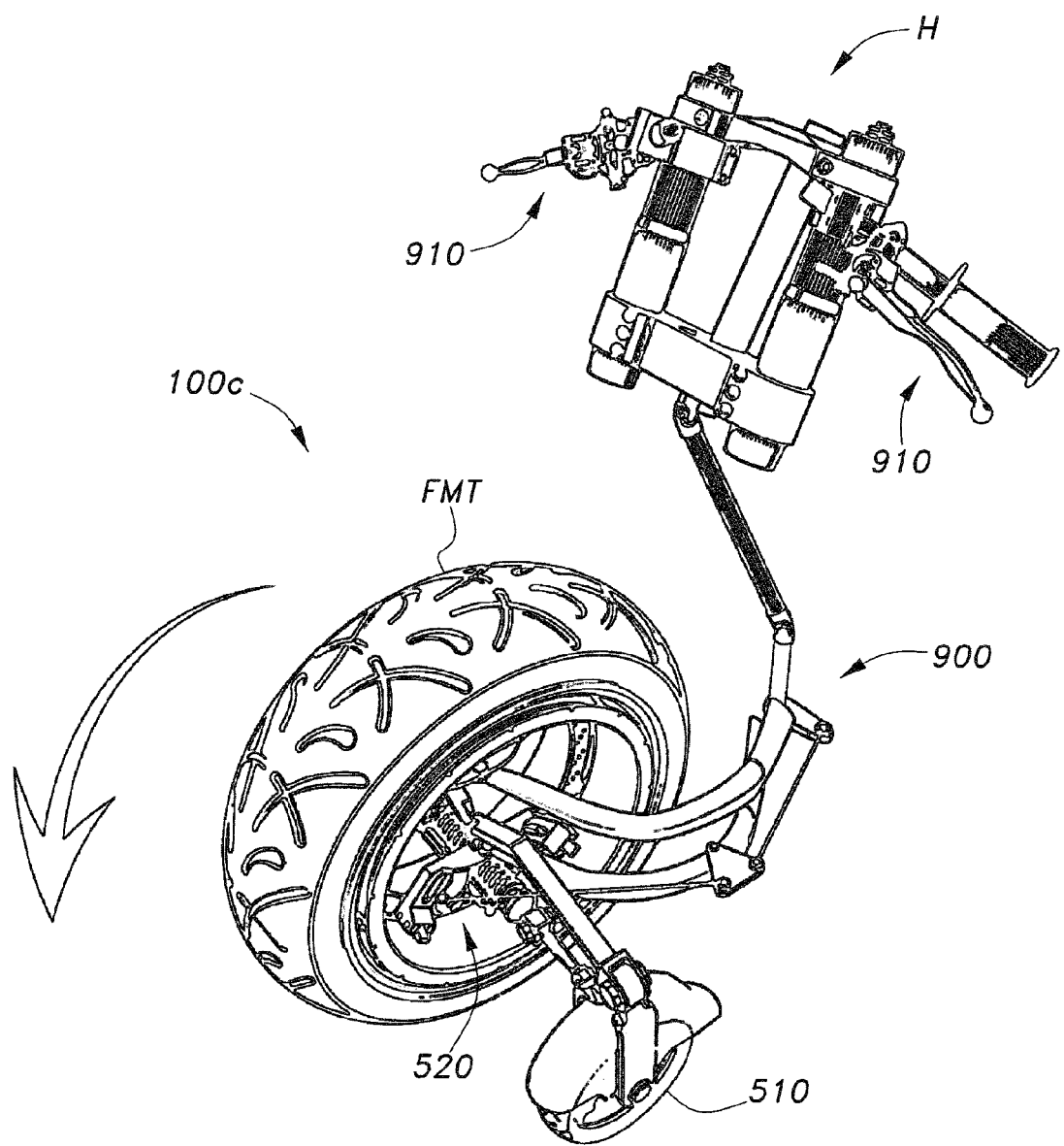
FIG. 9B is an illustration of a steering mechanism coupled to a third embodiment of a hubless wheel system positioned within a front motorcycle tire, wherein the front motorcycle tire is turning to the left, according to the present invention.

Referring to FIGS. 9A and 9B, the front motorcycle tire FMT having the third embodiment 100c (or the fourth embodiment 100d, described below) can then be attached to a steering mechanism H of the motorcycle M, such as by a connection mechanism 900. For example, the connection mechanism 900 can connect the steering mechanism H to the front motorcycle tire FMT by attaching onto the upper portion 300a and the lower portion 300b of the bracket assembly 150c of the third embodiment 100c, as illustrated in FIGS. 9A and 9B, so that the front motorcycle tire FMT can be controlled by the steering mechanism H. Similar to the first embodiment 100a, the front motorcycle tire FMT having the third embodiment 100c (or fourth embodiment 100d) can be passively rotated, such as by the force provided by the rear motorcycle tire RMT. Moreover, it is to be noted, that the steering mechanism H, such as through the connection mechanism 900, can be configured to activate the at least one brake disc caliper 174, such as through a braking system 910, to stop the rotation of the front motorcycle tire FMT. The braking system 910 can be any suitable braking system known in the art. It is to be understood that the brake disc 170 (FIG. 6B) may be positioned in the center of the outer ring 176 to eliminate, such as substantially eliminate, any swerving, wobbling, or imbalance of the front motorcycle time FMT when the braking system 910 is applied.

It is to be noted that similar to the first embodiment 100a and the second embodiment 100b, the bracket assembly 150c of the third embodiment 100c can include an advertisement assembly, such as the attachment plate AP (FIG. 5A), displaying an advertisement, a logo, or a brand, or a monitor (not shown), such as a water/dust proof monitor, displaying an advertisement, a logo, a brand, such as an aftermarket brand coupled to each secondary upper attachment member 309 of the upper portion 300a of the bracket assembly 150c. For example, the advertising plate AP (or the monitor) coupled to the upper portion 300a of the bracket assembly 150c of the front motorcycle tire FMT can display a logo, such as the Audi® logo, to individuals as the motorcycle passes by, as illustrated in FIG. 5A, in a similar fashion as the first embodiment 100a and second embodiment 100b, described herein. Further, the advertisement plate AP positioned on the upper portion 300a of the bracket assembly 150c of the front motorcycle tire FMT can serve to act as a counterweight for the front motorcycle tire FMT, such as when the motorcycle M is being turned so as to assist in balancing the motorcycle M. It is to be understood that the upper bracket 300a of the bracket assembly 150c for the rear motorcycle tire RMT can be similarly configured with secondary upper attachment members to attach a second advertising plate (not shown) displaying a logo, brand, or advertisement.

Figure 10:
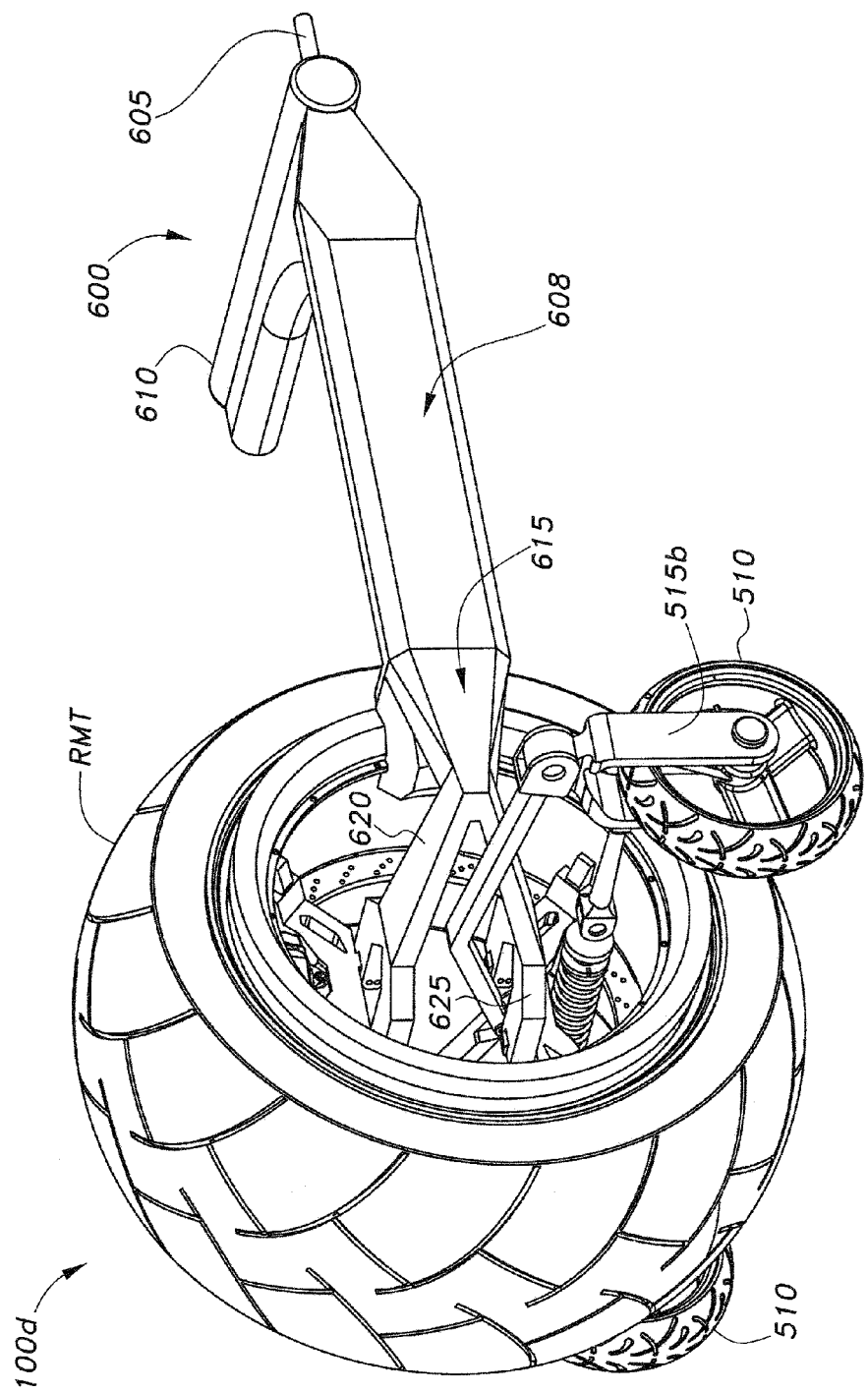
FIG. 10 is a side, perspective of a rear motorcycle tire having the fourth embodiment of a hubless wheel system, according to the present invention.
Figure 11A:
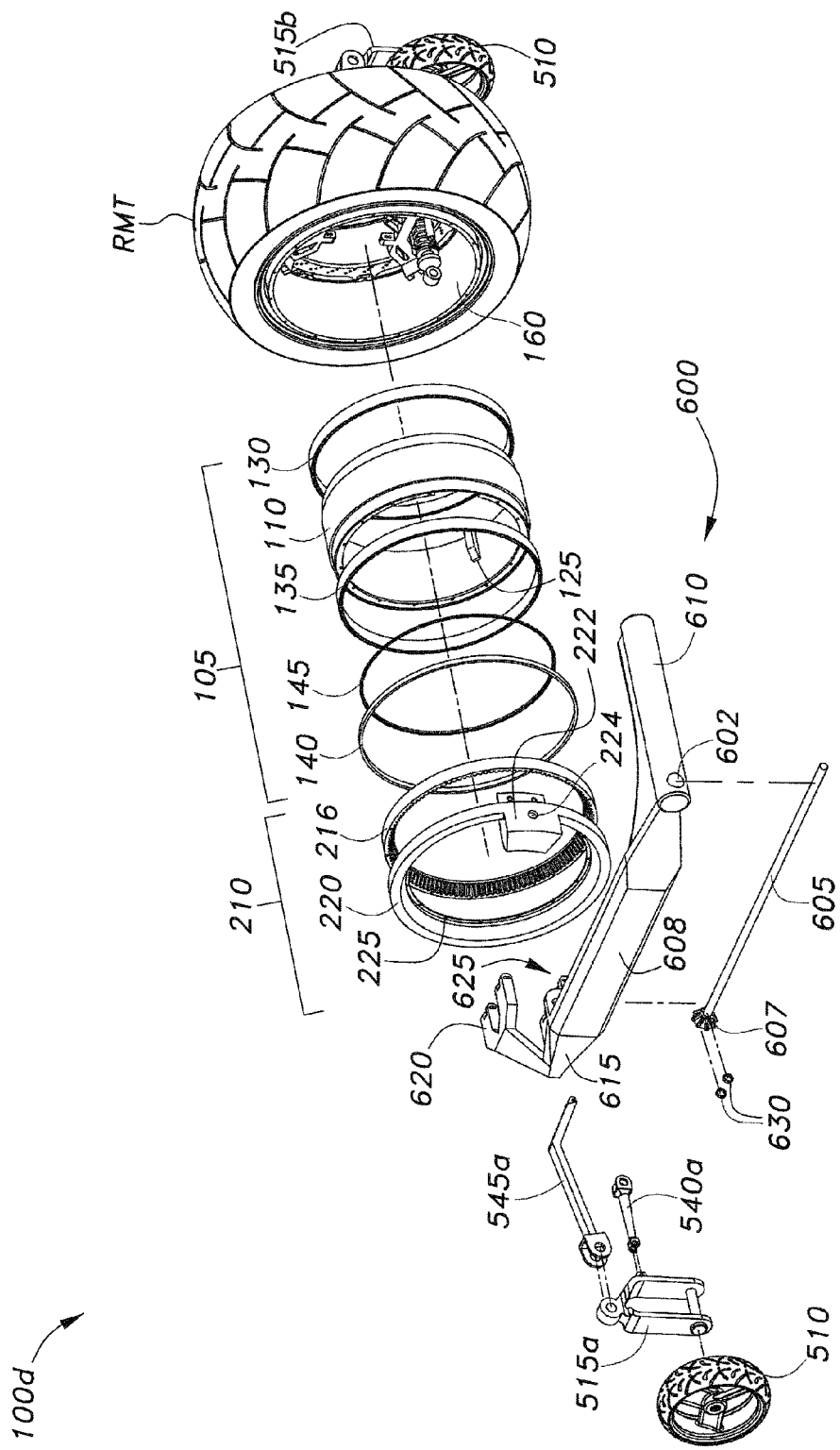
FIG. 11A is an exploded view of an inner ring assembly and another drive assembly for use in connection with a fourth embodiment of a hubless wheel system, according to the present invention.
Figure 11B:
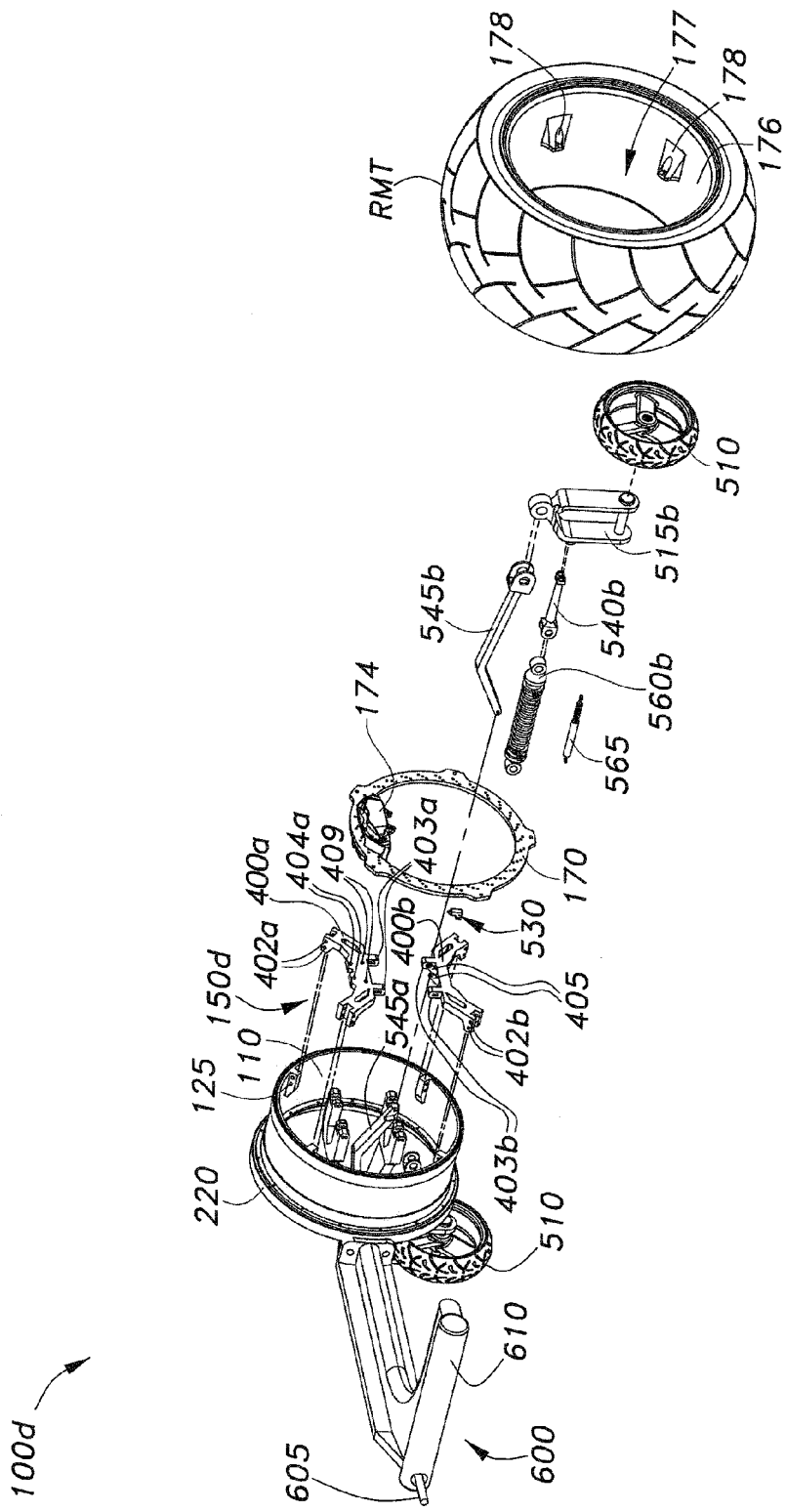
FIG. 11B is an exploded view of the inner ring assembly and another bracket assembly for use in connection with a fourth embodiment of a hubless wheel system, according to the present invention.

Referring to FIGS. 10-11C, similar to the third embodiment 100c, the fourth embodiment 100d also includes the inner ring assembly 105 having the main stationary ring 110, the middle ring assembly, and the outer ring 176. Further, similar to the third embodiment 100c, the fourth embodiment 100d includes the wheel assembly 500, the suspension assembly 520, and the step-lock assembly 530. However, the fourth embodiment 100d also includes a drive assembly 600 positioned in communicating relation with the outer ring 176, such that the rear motorcycle tire RMT having the fourth embodiment 100d can be actively rotated, and a bracket assembly 150d (FIG. 11B).

Similar to the drive assembly 210 of the second embodiment 100b, the drive assembly 600 of the fourth embodiment 100d includes the annular rack 216 that can be mounted on the inner portion 177 of the outer ring 176 positioned within the rear motorcycle tire RMT, a drive shaft 605, such as a substantially elongated drive shaft suitable to actively rotate the rear motorcycle tire RMT, a gear 607, such as a pinion gear, positioned in fluid communication with the annular rack 216, and a plurality of bearings 630, such as ball bearings, configured to aid in the rotation, such as the smooth rotation, of the drive shaft 605. It is to be noted that the annular rack 216 can provide rotating force to the rear motorcycle tire RMT so that the rear motorcycle tire RMT can rotate about the bracket assembly 150d in a similar fashion to the second embodiment 100b.

However, the drive assembly 600 of the fourth embodiment 100d also includes a support member 608 configured to house and protect, such as substantially protect, the drive shaft 605 from being damaged. The support member 608 having a front end 610 that can be attached to the motorcycle and a back end 615 having an upper arm 620 and a lower arm 625 configured for mounting onto the bracket assembly 150d of the fourth embodiment 110d, as described below. It is to be noted that the support member 608 can include an opening 602 through which the drive shaft 605 can extend so as to communicate with a power source (not shown), such as an engine, configured to rotate the drive shaft 605, which, in turn, can rotate the gear 607 so as to rotate the rear motorcycle tire RMT, such as in a forward direction or in a rearward direction.

Similar to the bracket assemblies 150b, 150c of the second embodiment of the hubless wheel system 100b and the third embodiment of the hubless wheel system 100c, respectively, the bracket assembly 150d of the fourth embodiment of the hubless wheel system 100d is configured for mounting onto inner ring mounting brackets 125 positioned within the main stationary ring 110 in a similar fashion as with the other embodiments 100a-100c. The fourth embodiment of the hubless wheel system 100d includes two members, such as an upper portion 400a and a lower portion 400b. The upper portion 400a of the fourth bracket assembly 150d can include a plurality of primary upper openings 402a, each of the plurality of primary upper openings 402a configured for receiving fasteners for mounting onto a corresponding inner ring mounting bracket 125 positioned within the main stationary ring 110 in a similar fashion as with the other embodiments 100a-110c, a plurality of upper coupling members 403a (desirably two upper coupling members 403a), each of the plurality of upper coupling members 403a of the bracket assembly 150d of the fourth embodiment 100d configured for attaching onto the upper arm 620 of the support member 608 of the drive assembly 600, such as with any suitable type of fastener, such as a screws, a plurality of secondary upper openings 404a, each of the plurality of secondary upper openings 404a configured for receiving a fastener to secure the at least one disc brake caliper 174, as described above, and a plurality of tertiary upper openings 409 configured for mounting the advertising plate AP, as illustrated in FIG. 5A.

The lower portion 400b of the bracket assembly 150d of the fourth embodiment 100d includes a plurality of primary lower openings 402b, each of the plurality of primary lower openings 402b configured for mounting onto a corresponding inner ring mounting bracket 125 positioned within the main stationary ring 110 (as described above), a plurality of lower coupling members 403b configured for attaching onto the lower arm 625 of the support member 608 of the drive assembly 600, such as with any suitable type of fastener, such as a screws, and a plurality of lower attachment members 405 (preferably two lower attachment members 405) configured to attach onto the side wheel assembly 500, as described above.

By way of operation, once the upper portion 400a and the lower portion 400b of the bracket assembly 150d of the fourth embodiment 100d have been secured to the main stationary ring 110 of the inner ring assembly 105 and the inner ring assembly 105 has been positioned within the middle ring assembly 159, as described above. The side wheel assembly 500 can be secured to the lower portion 400b of the bracket assembly 150d of the fourth embodiment 100d. The suspension assembly 520 can be pivotally attached to the first wheel fork 515a and the second wheel fork 515a, and the step-lock assembly 530 can be attached, such as by any suitable means, to the lower portion 400b of the bracket assembly 150d of the fourth embodiment 100d, as illustrated in FIG. 11C. Subsequently, the middle ring assembly 159 can be inserted and secured to the outer ring 176, such as the outer ring 176 of the rear motorcycle tire RMT, in a similar fashion as the second embodiment 100b.

The drive shaft 605 of the drive assembly 600 of the fourth embodiment 100d positioned within the rear motorcycle tire RMT can then be attached to a power source (not shown) similar to the second embodiment 100b. For example, the drive shaft 605 can be connected to the power source, such as an engine, configured to rotate the drive shaft 605. The rotating drive shaft 605 can, in turn, rotate the gear 214 so as to rotate the annular rack 216 attached to the outer ring 176 coupled to the rear motorcycle tire RMT, such as in a forward direction or in a rearward direction.

It is to be noted that similar to the third embodiment 100c, the bracket assembly 150d of the fourth embodiment 100d can include an advertisement assembly, such as the advertising plate AP (FIG. 5A), displaying an advertisement, a logo, or a brand, or a monitor (not shown), such as a water/dust proof monitor, displaying an advertisement, a logo, a brand, such as an aftermarket brand coupled to each tertiary upper attachment member 409 of the upper portion 400a of the bracket assembly 150d. For example, the advertising plate AP (or the monitor) coupled to the upper portion 400a of the bracket assembly 150d of the front motorcycle tire FMT, such as by any suitable means, can display a logo, such as the Audi® logo, to individuals as the motorcycle passes by, as illustrated in FIG. 5A, in a similar fashion as the first embodiment 100am, the second embodiment 100b, and the third embodiment 100c, described herein. Further, the advertisement plate AP positioned on the upper portion 400a of the bracket assembly 150d of the front motorcycle tire FMT can serve to act as a counterweight for the front motorcycle tire FMT, such as when the motorcycle M is being turned so as to assist in balancing the motorcycle M. It is to be understood that the upper bracket 400a of the bracket assembly 150d for the rear motorcycle tire RMT can be similarly configured, such as with tertiary upper attachment members, so as to attach a second advertising plate (not shown) (or a monitor) displaying a logo, brand, or advertisement.

It is to be understood that the present invention is not limited to the embodiments described above, but encompasses any and all embodiments within the scope of the following claims.

I claim:

1. A hubless wheel system for motor vehicles, comprising:
    an inner ring assembly including a main stationary ring having an inner track and an outer track and a plurality of inner ring mounting brackets positioned within the main stationary ring, a first bearing rotatably mounted on the inner track, a second bearing rotatably mounted on the outer track, and a side plate positioned in communicating relation with the second bearing;
    a middle ring assembly mounted onto the first and second bearings of the inner ring assembly, the middle ring assembly having a middle ring and a brake disc secured to the middle ring, the middle ring including an inner side and an outer side, the inner side having a plurality of mounting tabs connected to the brake disc;
    an outer ring having an inner portion and a plurality of outer ring mounting brackets positioned on the inner portion of the outer ring, the middle ring being positioned within the outer ring; and
    a bracket assembly positioned within the main stationary ring,
    wherein the inner ring assembly, the middle ring assembly, and the outer ring assembly of the hubless wheel system for motor vehicles are arranged in a coaxial arrangement.

2. The hubless wheel system for motor vehicles according to claim 1, further comprising a drive assembly positioned in communicating relation with the outer ring, the drive assembly having an annular rack mounted on the inner portion of the outer ring and a drive shaft including a gear, the gear positioned in fluid communication with the annular rack.

3. The hubless wheel system for motor vehicles according to claim 1, wherein the middle ring assembly further comprises at least one disc brake caliper being positioned in communicating relation with the brake disc.

4. The hubless wheel system for motor vehicles according to claim 1, wherein the bracket assembly comprises a bracket having a plurality of ends, the bracket configured for attachment to the main stationary ring and the at least one disc brake caliper.

5. The hubless wheel system for motor vehicles according to claim 4, wherein the bracket comprises an advertising section configured for displaying an advertisement.

6. The hubless wheel system for motor vehicles according to claim 1, wherein the bracket assembly comprises an upper bracket portion and a lower bracket portion spaced from the upper bracket portion.

7. The hubless wheel system for motor vehicles according to claim 6, wherein the bracket assembly further includes an upper suspension arm positioned in communicating relation with the upper portion and a lower suspension arm positioned in communicating relation with the lower portion.

8. The hubless wheel system for motor vehicles according to claim 6, further comprising a side wheel assembly coupled to the lower portion of the bracket assembly, the side wheel assembly having a plurality of side wheels.

9. The hubless wheel system for motor vehicles according to claim 8, wherein the side wheel assembly comprises a suspension assembly.

10. The hubless wheel system for motor vehicles according to claim 8, comprising a step-lock assembly including a member having a first end coupled to the lower portion of the bracket assembly and a second end positioned in communicating relation with the side wheel assembly.

11. A hubless wheel system for motor vehicles, comprising:
    an inner ring assembly including a main stationary ring having an inner track and an outer track and a plurality of inner ring mounting brackets positioned within the main stationary ring, a first bearing rotatably mounted on the inner track, a second bearing rotatably mounted on the outer track, and a side plate positioned in communicating relation with the second bearing;
    a middle ring assembly mounted onto the first and second bearings of the inner ring assembly, the middle ring assembly having a middle ring and a brake disc secured to the middle ring, the middle ring including an inner side and an outer side, the inner side having a plurality of mounting tabs connected to the brake disc;
    an outer ring having an inner portion and a plurality of outer ring mounting brackets positioned on the inner portion of the outer ring, the middle ring being positioned within the outer ring;

a bracket assembly positioned within the main stationary ring, the bracket assembly having an upper bracket portion and a lower bracket portion spaced from the upper bracket portion; and a drive assembly positioned in communicating relation with the outer ring, the drive assembly having an annular rack mounted on the inner portion of the outer ring and a drive shaft including a gear, the gear positioned in fluid communication with the annular rack, wherein the inner ring assembly, the middle ring assembly, and the outer ring assembly of the hubless wheel system for motor vehicles are arranged in a coaxial arrangement.

12. The hubless wheel system for motor vehicles according to claim 11, further comprising a side wheel assembly coupled to the lower portion of the bracket assembly, the side wheel assembly having a plurality of side wheels.

13. The hubless wheel system for motor vehicles according to claim 12, wherein the side wheel assembly comprises a suspension assembly.

14. The hubless wheel system for motor vehicles according to claim 12, further comprising a step-lock assembly including a member having a first end coupled to the lower portion of the bracket assembly and a second end positioned in communicating relation with the side wheel assembly.

15. The hubless wheel system for motor vehicles according to claim 11, wherein the middle ring assembly further comprises at least one disc brake caliper positioned in communicating relation with the brake disc.

16. The hubless wheel system for motor vehicles according to claim 11, wherein the bracket assembly further includes an upper suspension arm positioned in communication relation with the upper portion and a lower suspension arm positioned in communicating relation with the lower portion.

17. The hubless wheel system for motor vehicles according to claim 11, wherein the drive assembly further includes a support member configured for housing the drive shaft, the support member having a front end and a back end having an upper arm and a lower arm.

18. A hubless wheel system for motor vehicles, comprising:

an inner ring assembly including a main stationary ring having an inner track and an outer track and a plurality of inner ring mounting brackets positioned within the main stationary ring, a first bearing mounted on the inner track, a second bearing mounted on the outer track, and a side plate positioned in communicating relation with the second bearing;

a middle ring assembly mounted onto the first and second bearings of the inner ring assembly, the middle ring assembly having a middle ring and a brake disc secured to the middle ring, the middle ring including an inner side and an outer side, the inner side having a plurality of mounting tabs connected to the brake disc;

an outer ring having an inner portion and a plurality of outer ring mounting brackets positioned on the inner portion of the outer ring, the middle ring being positioned within the outer ring;

a bracket assembly positioned within the main stationary ring, the bracket assembly having an upper bracket portion and a lower bracket portion;

a drive assembly positioned in communicating relation with the outer ring, the drive assembly having an annular rack mounted on the inner portion of the outer ring and a drive shaft including a gear, the gear positioned in fluid communication with the annular rack;

a side wheel assembly being coupled to the lower portion of the bracket assembly, the side wheel assembly having a plurality of side wheels; and a suspension assembly, wherein the inner ring assembly, the middle ring assembly, and the outer ring assembly of the hubless wheel system for motor vehicles are arranged in a coaxial arrangement.

19. The hubless wheel system for motor vehicles according to claim 18, wherein the drive assembly further includes a support member configured for housing the drive shaft, the support member having a front end and a back end having an upper arm and a lower arm.

20. The hubless wheel system for motor vehicles according to claim 18, further comprising a step-lock assembly including a member having a first end coupled to the lower portion and a second end positioned in communicating relation with the side wheel assembly.

* * * * *